(12) United States Patent
Nichogi et al.

(10) Patent No.: US 7,035,472 B2
(45) Date of Patent: Apr. 25, 2006

(54) IMAGE COMPRESSION DEVICE AND IMAGE UNCOMPRESSION APPARATUS UTILIZING THE SAME

(75) Inventors: Mutsuko Nichogi, Tokyo (JP); Katsuji Aoki, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 596 days.

(21) Appl. No.: 10/188,932

(22) Filed: Jul. 3, 2002

(65) Prior Publication Data
US 2003/0021472 A1 Jan. 30, 2003

(30) Foreign Application Priority Data
Jul. 10, 2001 (JP) .............................. 2001-208825

(51) Int. Cl.
*G06K 9/36* (2006.01)
(52) U.S. Cl. ....................... 382/239; 382/232
(58) Field of Classification Search ........ 382/232–252, 382/165
See application file for complete search history.

(56) References Cited

U.S. PATENT DOCUMENTS 5,479,587 A * 12/1995 Campbell et al. .......... 358/1.15
5,995,644 A * 11/1999 Lai et al. ................... 382/169

FOREIGN PATENT DOCUMENTS

JP 09-098295 4/1997
JP 11-085952 3/1999

OTHER PUBLICATIONS

"A New Compression Method of Multispectral Images Based on Principal Component Analysis" by Wataru Kondou et al., Display and Imaging 2000, vol. 8, pp. 301-307.

\* cited by examiner

Primary Examiner—Duy M. Dang
(74) Attorney, Agent, or Firm—RatnerPrestia

(57) ABSTRACT

Disclosed are an image compression device for accurately compressing and reproducing a multi-spectral image, an image of a color space not dependent upon a device and lighting or a multi-primary-color image, and an image uncompression apparatus utilizing the same. An image compression device comprises a cluster storing section for storing a parameter for classifying image signals of an input image into a plurality of clusters, a cluster fixing section for fixing which cluster each of the inputted image signal belongs to that is stored in the cluster storing section; and a cluster-base image compressing section for performing a different image compression processes of image signal on a cluster-by-cluster basis. The image compression device thus configured can accurately compress and reproduce, at high compression ratio, a multi-spectral image, an image of a color space not dependent upon a device and lighting or a multi-primary-color image. Accordingly, when transmitting and receiving multi-dimensional images between remote locations, the data amount of transmission can be reduced for efficient transmission and reception.

27 Claims, 26 Drawing Sheets

Fig. 11

$$X = \begin{pmatrix} r_{1,1} & r_{2,1} & r_{3,1} & r_{3,1} & r_{4,1} & r_{5,1} & \cdots & r_{24,1} \\ r_{1,2} & \cdots & \cdots & \cdots & \cdots & \cdots & \cdots & \cdots \\ \vdots & \vdots & \vdots & \vdots & \vdots & \vdots & \vdots & \vdots \\ r_{1,31} & r_{2,31} & r_{3,31} & r_{3,31} & r_{4,31} & r_{5,31} & \cdots & r_{24,31} \end{pmatrix}$$

Color data within Cluster 2 used W times

Color data within Cluster 1 used once

Mean vectors of each cluster

Basis common between Clusters

IMAGE COMPRESSION DEVICE AND IMAGE UNCOMPRESSION APPARATUS UTILIZING THE SAME

FIELD OF THE INVENTION

The present invention relates to an image compression device for accurately compressing and reproducing a multi-spectral image, an image of a color space not dependent upon an apparatus or lighting or a multi-primary-color image, and to an image uncompression apparatus utilizing the same.

BACKGROUND OF THE INVENTION

Recently, a camera, called a multi-spectral camera or hyper-spectral camera, has been developed as an image input device for inputting multi-dimensional images. For example, shown in FIG. 1 is a color reproducing apparatus described in a publication of JP-A-11-85952. A subject 101 is taken a multi-spectral image by a field-sequential multi-spectral camera 102 which takes an image onto an imaging device, e.g. CCD 105, while rotating a turret 104 structured with a plurality of band-pass filters by a motor 103. The multi-spectral image a taken by the multi-spectral camera 102 is converted, in a color space converting section 107, into a color-space image b (e.g. XYZ image) not dependent upon the device while making a reference to an input profile 106 of the multi-spectral camera 102. The converted color-space image b, in an output value converting section 109, is further converted into a device value suited for the characteristic of the image output device 110 by making reference to an output profile 108. Thus, an obtained output image c (e.g. multi-primary-color image) is outputted.

Herein, explained is the color-space image b not dependent upon the device. The devices for processing color images include various ones, e.g. scanners, digital cameras, printers and displays. There is one scheme for exchanging image data between these apparatuses that once converts the color image data inputted at an input device into independent color-space image data not dependent upon the device and then converts it into color image data for output to an output device. By thus establishing a conversion of between a signal of the image input device and a color space not dependent upon the device, it is possible to deliver data to an image output device of any kind. Thus, there is no need to determine color conversion processes in the number of combinations of input and output devices.

Meanwhile, in case the color image data inputted at the image input device is converted into independent color-space image data not dependent upon not only the device but also the lighting, the output device can output an image based on the lighting different from the lighting of upon inputting the image.

The independent color space not dependent upon the device, generally, uses XYZ three stimulus values defined by the international standard organization CIE or a color appearance model with L*a*b* color space, L*u*v* color space or CAM97s color space. The color appearance model has an attribute value calculated from XYZ three stimulus values. Consequently, provided that XYZ three stimulus values can be estimated from a signal of an image input/output device, the above color conversion is possible.

Meanwhile, the color space not dependent upon a device and lighting generally uses a spectral reflectance of an object. By integrating a multiplication of a desired lighting on a spectral reflectance, XYZ three stimulus values can be calculated.

In a color reproducing apparatus of FIG. 1, where image input and output devices are remotely located, transmission image has the following cases. Namely, a multi-spectral image a as an output of a multi-spectral camera is transmitted to carry out the subsequent process at the remote site; a color-space image b as an output of the color space converting section 107 is transmitted to carry out the subsequent process at the remote site; or an output image c as an output of the output value converting section 109 is transmitted only for display at the remote site.

In any of the cases, however, the amount of data is huge as compared to the conventional RGB image. For example, where 31-dimensional spectral reflectance information sampled at an interval of 10 nm on a visible range of 400 nm to 700 nm is made into a 512×480 image, 7 MB or greater is required. Consequently, it is preferred to carry out compression to a possible extent even at the present the storage capacity and transmission speed has increased.

There is a conventional method for compressing a multi-spectral image, e.g. "Consideration on a Multi-band Image Compression Method Using a Principal Component Analysis" in a document Display and Imaging 2000, Vol. 8, pp. 301–307. This document discloses four compression methods, i.e. (1) a method of conducting a principal component analysis on a multi-spectral image to delete a higher-order term, (2) a method of dividing a multi-spectral image into rectangular blocks to carry out discrete cosine transformation on a block-by-block basis, (3) a method of conducting a principal component analysis on a multi-spectral image and thereafter dividing it into rectangular blocks to carry out discrete cosine transformation on a block-by-block basis, and (4) a method of dividing a multi-spectral image into rectangular blocks to thereafter carry out principal component analysis and discrete cosine transformation on a block-by-block basis.

These methods carry out principal component analysis on the entire of a multi-spectral image or on each of the rectangularly divided blocks thereof. In case the block size is small, there is a high possibility that the block at its inside be constituted by a similar color and hence a high post-decompression reproduction accuracy. However, there is an increased amount of calculation because of performing principal component analyses commensurate with the number of blocks. Meanwhile, basis functions must be transmitted in an amount corresponding to the number of blocks, resulting in decreased compression ratio. Conversely, in case block size is increased, there is less possibility that the block at its inside be constituted by a similar color. This results in a decrease of post-decompression reproduction accuracy.

SUMMARY OF THE INVENTION

The present invention has been made in view of the foregoing points. It is an object of the invention to provide an image compression device for accurately compressing and reproducing, at high compression ratio, a multi-spectral image, an image of a color space not dependent upon a device and lighting or a multi-primary-color image, and an image uncompression apparatus utilizing the same.

An image compression device according to the present invention comprises: a cluster storing section for storing a parameter for classifying image signals of an input image into a plurality of clusters; a cluster fixing section for fixing which cluster each of the inputted image signal belongs to by the use of the parameter; and a cluster-based image compression section for performing different image compression processes on a cluster-by-cluster basis.

Meanwhile, an image uncompression apparatus according to the invention comprises a cluster-based image uncompression section for carrying out different reproducing process on a cluster-by-cluster basis.

This can realize the compression and reproduction of high compression ratio and reproducing accuracy.

Also, by providing the image compression device with a transmission-data determining section to vary transmission data depending upon a status of transmission and a reception-data determining section to vary reception data depending upon a status of reception, it is possible to efficiently transmit and receive multi-dimensional images including multi-spectral images.

BRIEF DESCRIPTION OF THE DRAWINGS

FIG. 11 is a concept figure explaining a concept of a weighted principal component analysis in the device of FIG. 3;

DESCRIPTION OF THE EXEMPLARY EMBODIMENT

Exemplary embodiments of the present invention are demonstrated hereinafter with reference to the accompanying drawings.

The image to be compressed by an image compression device and image uncompression apparatus of the present invention is any of a multi-spectrum image inputted from a multi-spectral camera, a color space expressing image not dependent upon the device and lighting or a multi-primary-color image as an image for an image output device for display with multiple primary colors.

The color space expressing image not dependent upon the device and lighting signifies, for example, an XYZ image, a spectral reflectance image, an image in a model space that various colors are to be seen, or an image in a color space linear to XYZ. Although an RGB image can be compressed by the same method, the effect of the invention is more conspicuous in multi-dimensional (multi-band) image rather than in three dimensions.

The below explanation of the invention takes a case to compress a spectral-reflectance image as an example of a to be compressed image.

1. First Exemplary Embodiment

Figure 1:
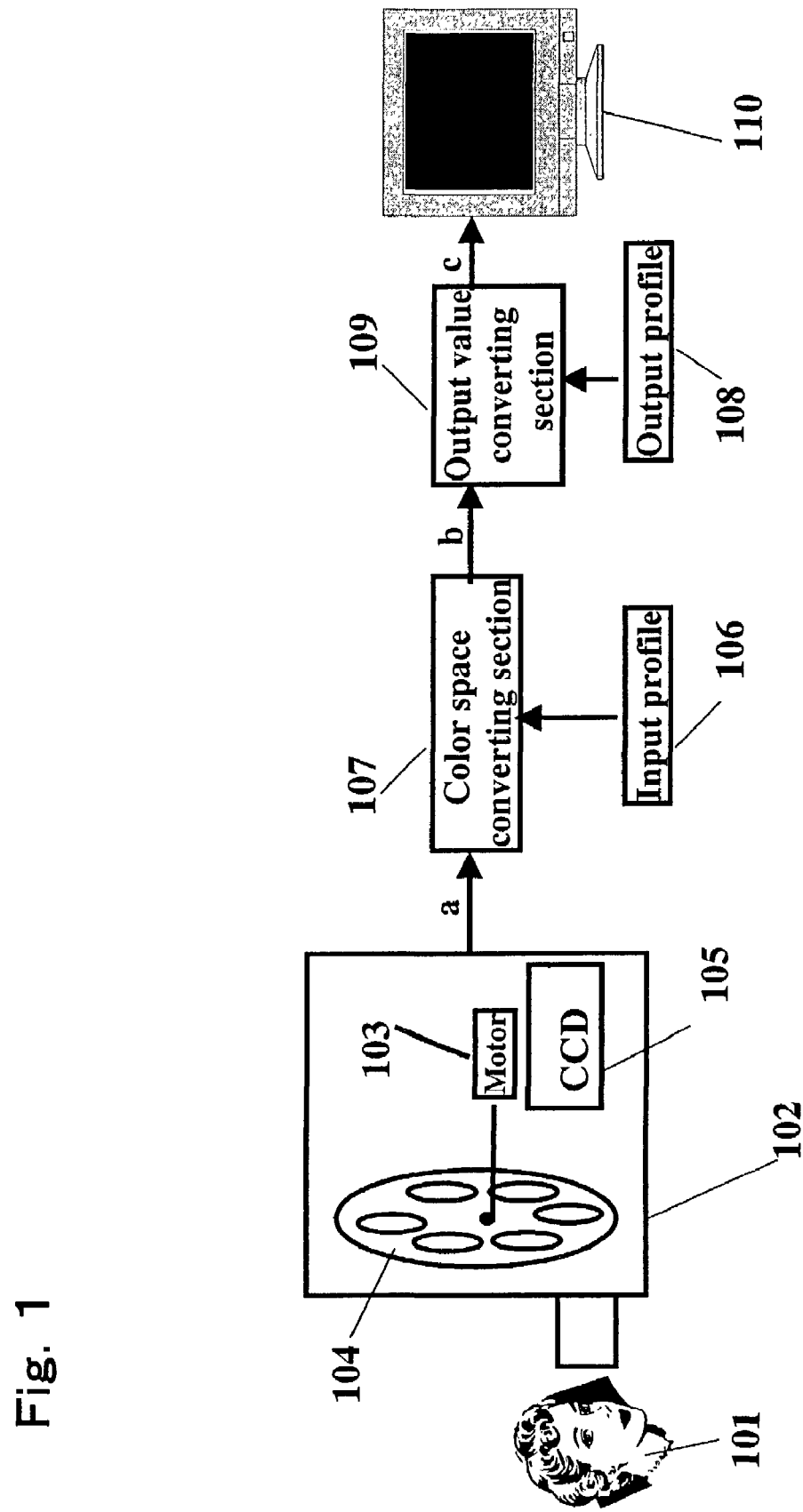
FIG. 1 is a block diagram showing a configuration of a conventional color reproducing apparatus.
Figure 2:
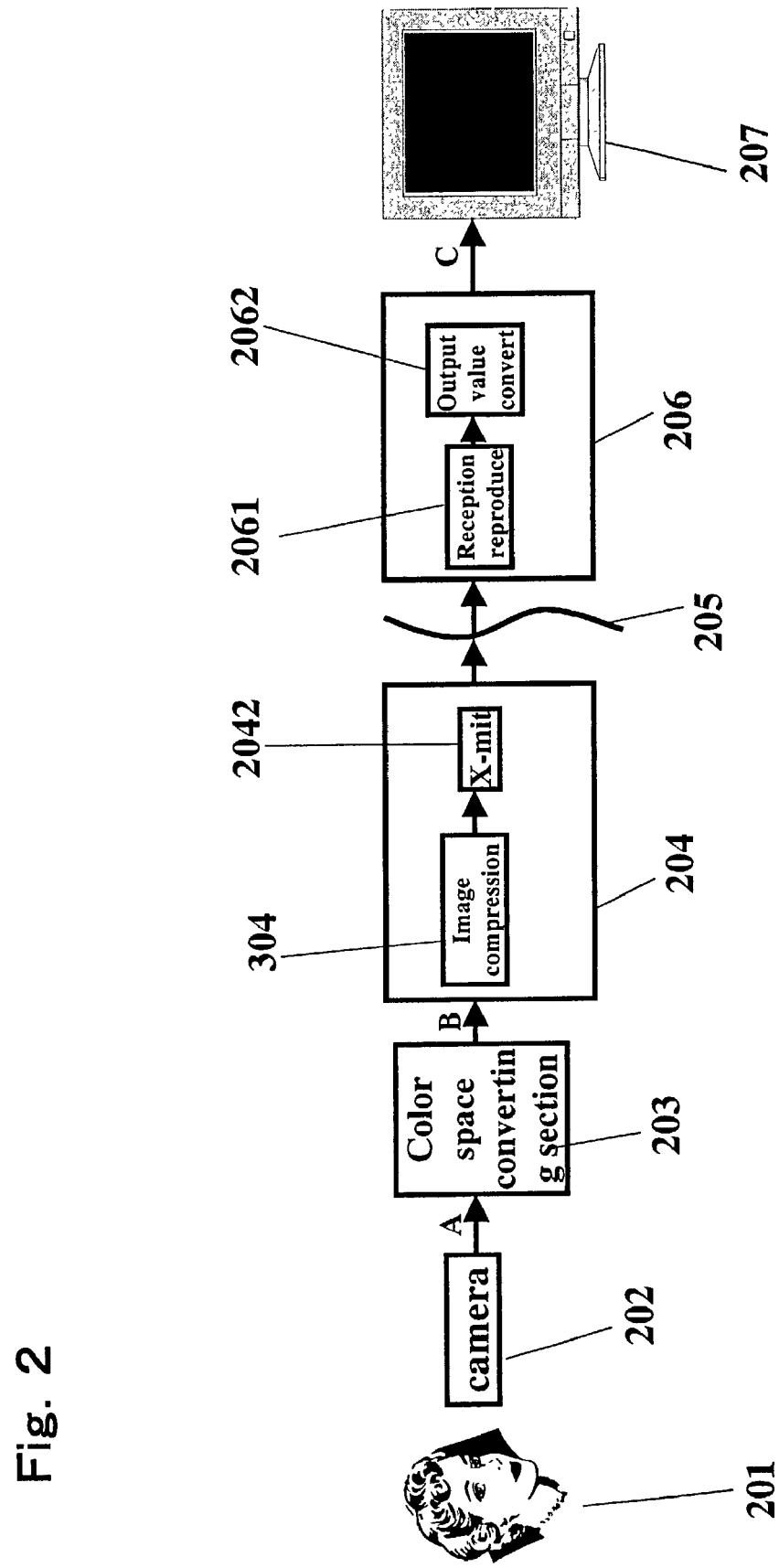
FIG. 2 is a block diagram showing an overall configuration of a color reproducing/compressing apparatus according to Embodiment 1 of the present invention.

FIG. 2 is a block diagram showing an overall configuration of a color reproduction/compression apparatus according Embodiment 1 of the present invention. A subject 201 is taken an image by an image input device 202, e.g. an extreme multi-band hyper-spectral camera, an RGB 3-banded camera or a multi-spectral camera having nearly 15 dimensions. From a device value of the camera, a spectral-reflectance image is estimated to output a spectral-reflectance image. The outputted spectral reflectance image A, in a color space converting section 203, is converted into a color-space image B not dependent upon the device, color, lighting and the like.

Then, the color-space image B is subjected to a predetermined image compression by an image compression device 304 of an image transmission device 204, and transmitted through a transmission section 2042 onto a network 205. The signal transmitted to the network 205 is received by an image reproduction device 206. The compressed image is reproduced by a reception reproducing section 2061, and then converted by an output value converting section 2062 into a device value suited for a characteristic of an image output device 207, thereby generating an output, image C of a multi-primary-colored image or the like., The obtained output image C is displayed on and printed by the output device 207.

Figure 3:
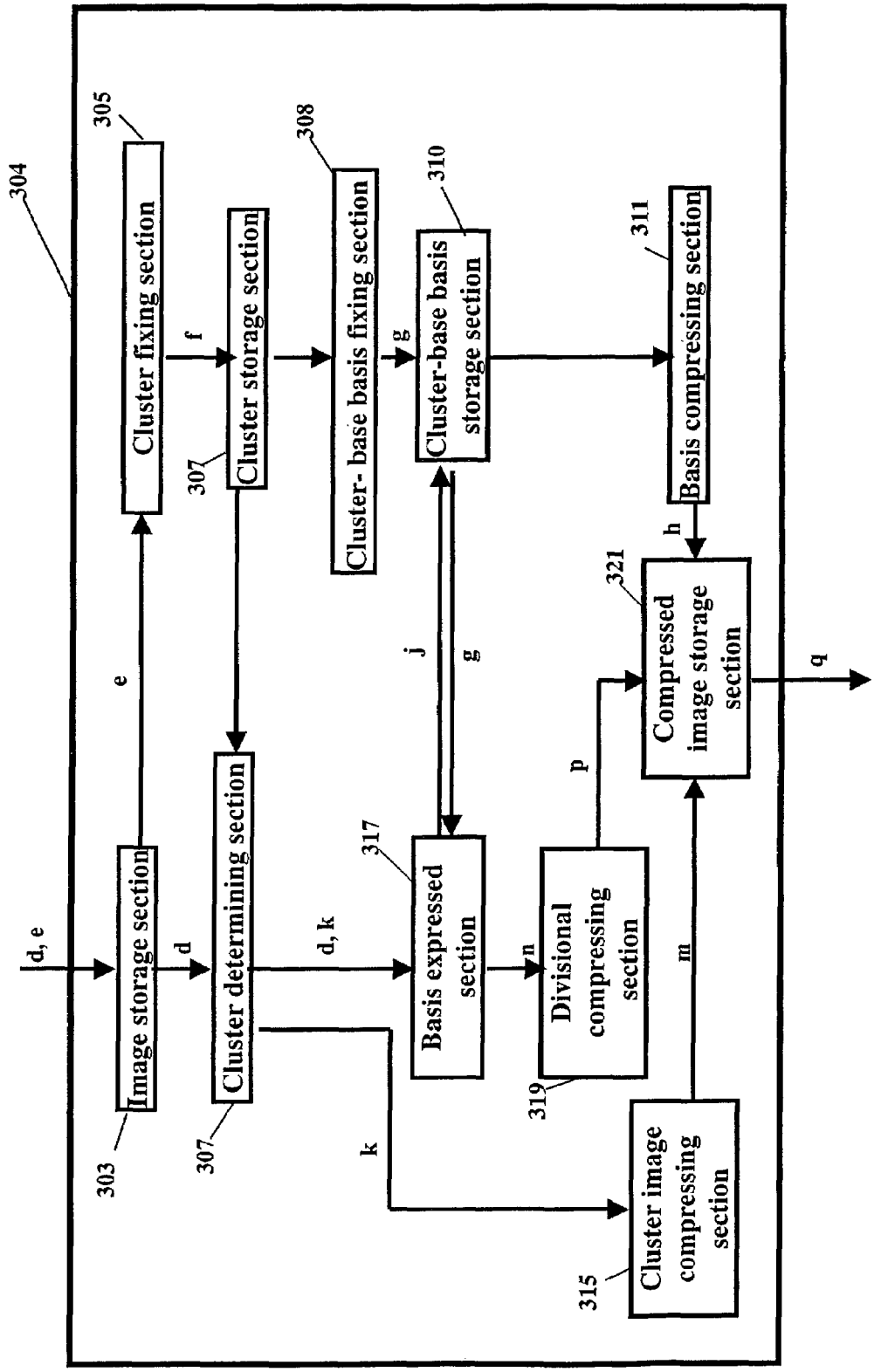
FIG. 3 is a block diagram showing an overall configuration of an image compression device of the color reproducing/compressing apparatus of FIG. 2.

FIG. 3 is a block diagram showing a configuration of the image compression device 304 of FIG. 2. In FIG. 3, the image compression device 304 carries out both of a pre-processing to determine a cluster from a color chart image e, and a compression process to compress a to-be-compressed image d. The to-be-compressed image d is a spectral reflectance image, which, if digitized at an interval of 10 nm on a visible portion of 380 nm to 780 nm, is changed into data having 31 dimensions per pixel. The color chart image e, a spectral reflectance image of a color chart to be used in fixing a cluster, is stored together with a to-be-compressed image d in an image storage section 303. A cluster fixing section 305 fixes the number and range of clusters to classify the pixels of the to-be-compressed image d from the color chart image e. The cluster parameter f, on the number or range of clusters fixed by the cluster fixing section 305, is stored in a cluster storage section 307. A cluster-base basis fixing section 308 calculates a basis function g to be used for each cluster stored in the cluster storage section 307. The calculated cluster-base basis function g is stored in a cluster-based base storage section 310. The cluster-base basis function g is compressed in a basis compressing section 311 to generate a compression basis h to be stored in a compressed image storage section 321.

A cluster fixing section 313, in an actual compression process, fixes a cluster to which each pixel of the to-be-compressed imaged belongs, to generate a cluster image k having, as a pixel value, a fixed cluster number. The generated cluster image k is compressed by a cluster image compressing section 315 into a compressed cluster image m and stored in the compressed image storage section 321.

A basis expressed section 317 converts each pixel value of the to-be-compressed image d into a vector value represented by a cluster basis shown by a corresponding pixel value of the cluster image k and generate a basis expressed image n. A divisional compressing section 319 collectively compresses the basis coefficient vectors in the first to third orders of a basis expressed image n, and individually compresses the basis coefficient vectors in the fourth or the below orders. The compressed basis expressed image p compressed by the divisional compressing section 319 is stored in the compression-image storage section 321. The compressed image storage section 321 integrates the compression cluster image m, the compression basis expressed image p and the compressed basis h together, to output a compressed image q.

Next, explanation will be made on the operation of the image compression device 304. The operation is divided into two processing, with a pre-processing to set a cluster from a color chart image e, and a compression process to actually compress the to-be-compressed image d. First explained is the pre-processing.

Figure 4:
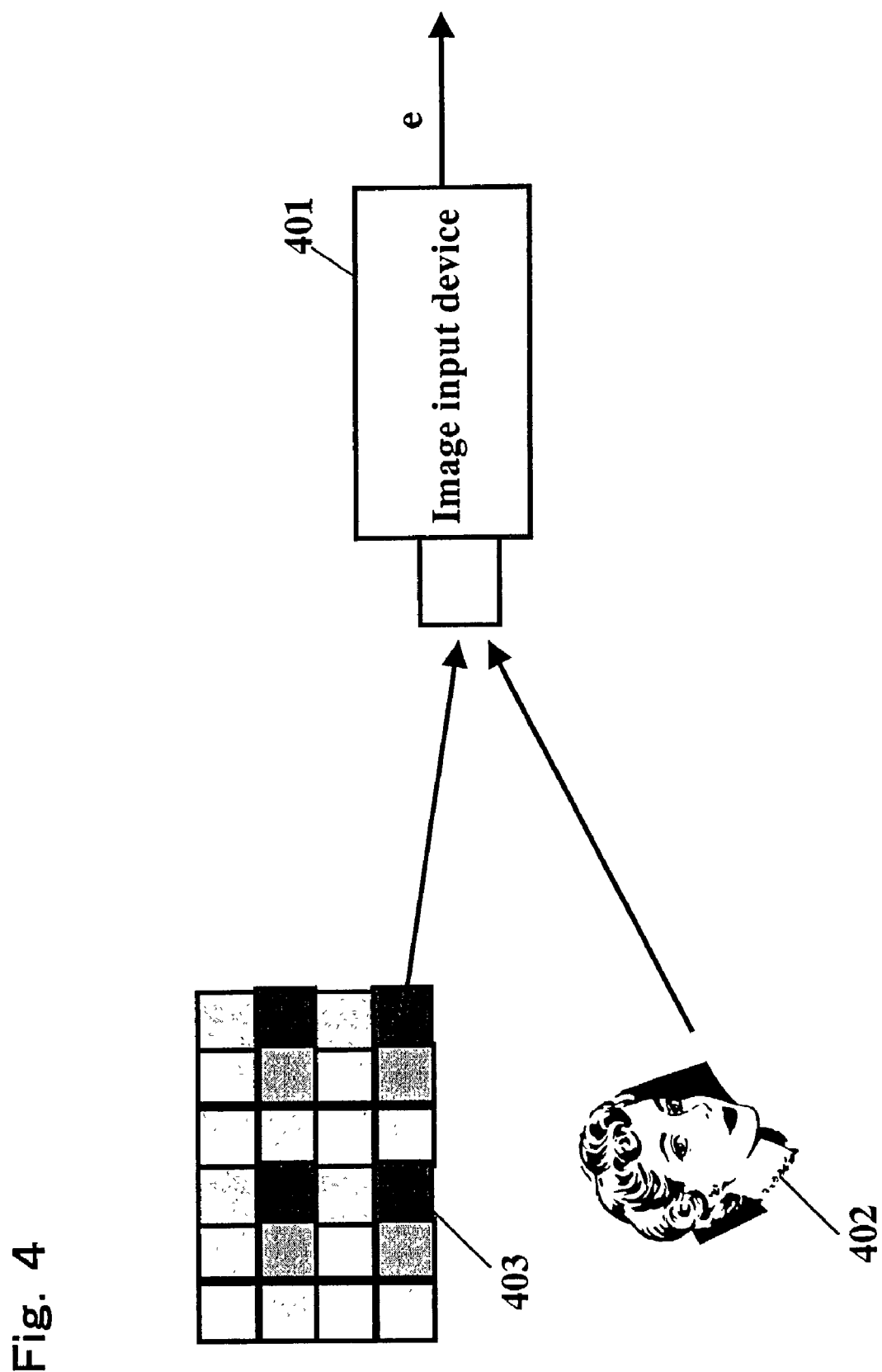
FIG. 4 is a concept figure explaining a concept of a color chart to be used in the device of FIG. 3.

In the pre-processing, as shown in FIG. 4 first inputted as a color chart image e a color to be reproduced with particular precision in a to-be-compressed image d or a color frequently existing in the to-be-compressed image d. In an example of a color to be reproduced with precision, a skin color may be inputted as a color chart 402 where the to-be-compressed image d is, for example, a skin image for medical diagnosis. A color chart 402 or color chart 403 is shot by the image input device 401, and outputted as a color image e and stored in the image storage section 303 of the image compression device 304.

The color chart image e stored in the image storage section 303 is delivered to the cluster fixing section 305. The cluster fixing section 305 fixes a plurality of clusters wherein one cluster is provided by the signals to be expressed by the same basis group from a color on the color chart 402, 403. The clusters fixed by the cluster fixing section 305 are stored as a cluster parameter f in the cluster storage section 307. This is also delivered to the cluster-base basis fixing section 308 where a base function g is fixed on a cluster-by-cluster basis and then outputted. The fixed cluster-based base function g is stored in a cluster-based storage section 310.

The above pre-process is preferably carried out when the image input device is changed, the lighting or environment of a subject is changed or the kind of a subject is changed.

Explanation will be now made on the operation to compress the to-be-compressed image d. The to-be-compressed image d is inputted to the image compression device 304 and stored in the image storage section 303. The cluster fixing section 313 fixes a cluster, to which each pixel of the to-be-compressed image d belongs, by the use of a cluster parameter f stored in the cluster storage section 307, to generate a new cluster image k using a cluster number as a pixel value. The obtained cluster value k is compressed in the cluster image compressing section 315 and outputted as a compressed cluster image m.

The cluster image k and the to-be-compressed image d, as outputs from the cluster fixing section 313, are sent to the basis expressed section 317. The basis expressed section 317 reads from the cluster image k a cluster each pixel of the to-be-compressed image d belongs, to invoke a basis function g the cluster belongs from the cluster-base basis storage section 310 and convert each pixel of the to-be-compressed image d into a basis expressing value. In this manner, a basis expressed image n is obtained.

The basis expressed image n obtained in the basis expressed section 317 is delivered to the divisional compressing section 319. The divisional compressing section 319 compresses collectively the basis expressing values in a predetermined higher-orders in the number of Z, and separately the basis expressing values in the orders lower than Z. In this manner, a compressed basis expressed image p is obtained.

Figure 5:
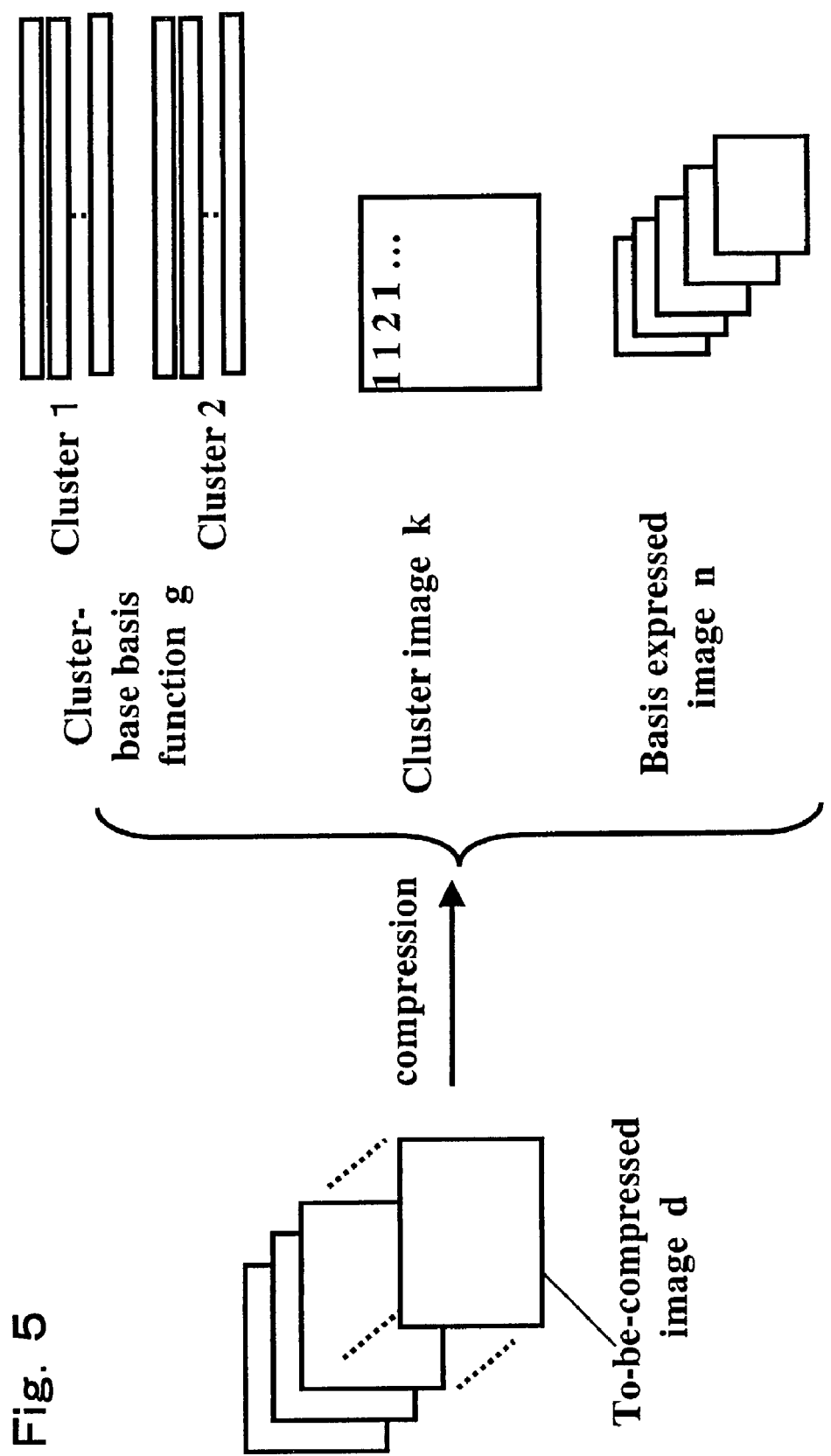
FIG. 5 is a concept figure explaining a concept of an image compression in the device of FIG. 3.

By the above compression process, the to-be-compressed image d is compressed in the three components, i.e. cluster image k, the basis expressed image n and the cluster-base basis function g, as shown in FIG. 5. Thus, obtained are a compressed cluster image m, a compressed basis expressed image p and a compressed basis h. The obtained compressed images are stored in the compressed image storage section 321, which is to be supplied to a transmitting section 2042 in FIG. 2 for transmission onto the network 205.

Explanation will be now made on the operation in each processing section of the image compression device 304. First detailed is the operation of a cluster fixing section 305 and cluster-base basis fixing section 308 for pre-processing in fixing clusters.

The cluster fixing section 305 is to fix a range of a color to be expressed in the same base group, wherein there are a method of calculation using a color chart image e and a method to be designated by a user.

First explained is a method to calculate clusters from a color chart image e. The color chart image e is formed with the major component colors of the to-be-compressed image d. The to-be-compressed image d is converted by a basis function previously calculated by a statistic process, into a new basis expressing value. The statistic process for determining a basis function includes some methods. There is a principal component analysis, as the most general method. The principal component analysis is an approach having an eigenvector of data variance/covariance matrix or correlation matrix as a component axis, or basis. Namely, in the case of carrying out a principal component analysis on a j-th cluster, as shown in Equation 1 is determined a variance/covariance matrix $C_{cov\ j}$ or correlation matrix $C_{rel\ j}$ of a matrix $X_j$ having, as column vectors, the spectral reflectance data in the number of num of a color chart image e, to calculate an eigenvector thereof. The matrix $M_j$ in Equation 1 has the data mean vectors μ arranged as column vectors in the number of num. The eigenvectors pj1, ..., Pj31 forms a basis. In this case, the eigenvector greatest in eigenvalue $\lambda_{ji}$ is a first principal component. In the subsequent, contribution ratio decreases as eigenvalue decreases.

$$C_{cov\ j} = X_j X_j^t$$
$$C_{rel\ j} = (X_j - M_j)(X_j - M_j)^t / (num - 1)$$
$$C_j P_{ji} = \lambda_{ji} p_{ji}$$

(i = 1, ... , 31) (j : cluster number)

$$C_{cov\ j} = X_j X_j^t$$
$$C_{rel\ j} = (X_j - M_j)(X_j - M_j)^t / (num - 1)$$
$$C_j P_{ji} = \lambda_{ji} p_{ji}$$

(i = 1, ... , 31) (j : cluster number)

Equation 1

The basis in a principal component analysis is to be selected such that minimized is the sum of the distances to dot groups given as data.

It is known that the data, to be difficultly expressed by a basis selected in a principal component analysis (abnormal data), can be determined by a Mahalanobis distance. Mahalanobis distance is shown in Equation 2.

$$Mahalanobis1 = x C_{cov\ j}^{-1} x$$
$$Mahalanobis2 = (x - \mu_j)^t C_{rel\ j}^{-1} (x - \mu_j)$$

Equation 2

Meanwhile, where data follows a normal distribution of degree m, Mahalanobis distance follows a chi-square distribution of freedom degree m.

Consequently, assuming that data is in a normal distribution, Mahalanobis distance is determined on each of data to remove, as abnormal data, the data a Mahalanobis distance is grater than a threshold $X^2$ represented by a chi-square distribution, whereby a data group to be represented by the same basis, i.e. cluster, can be determined.

Figure 6:
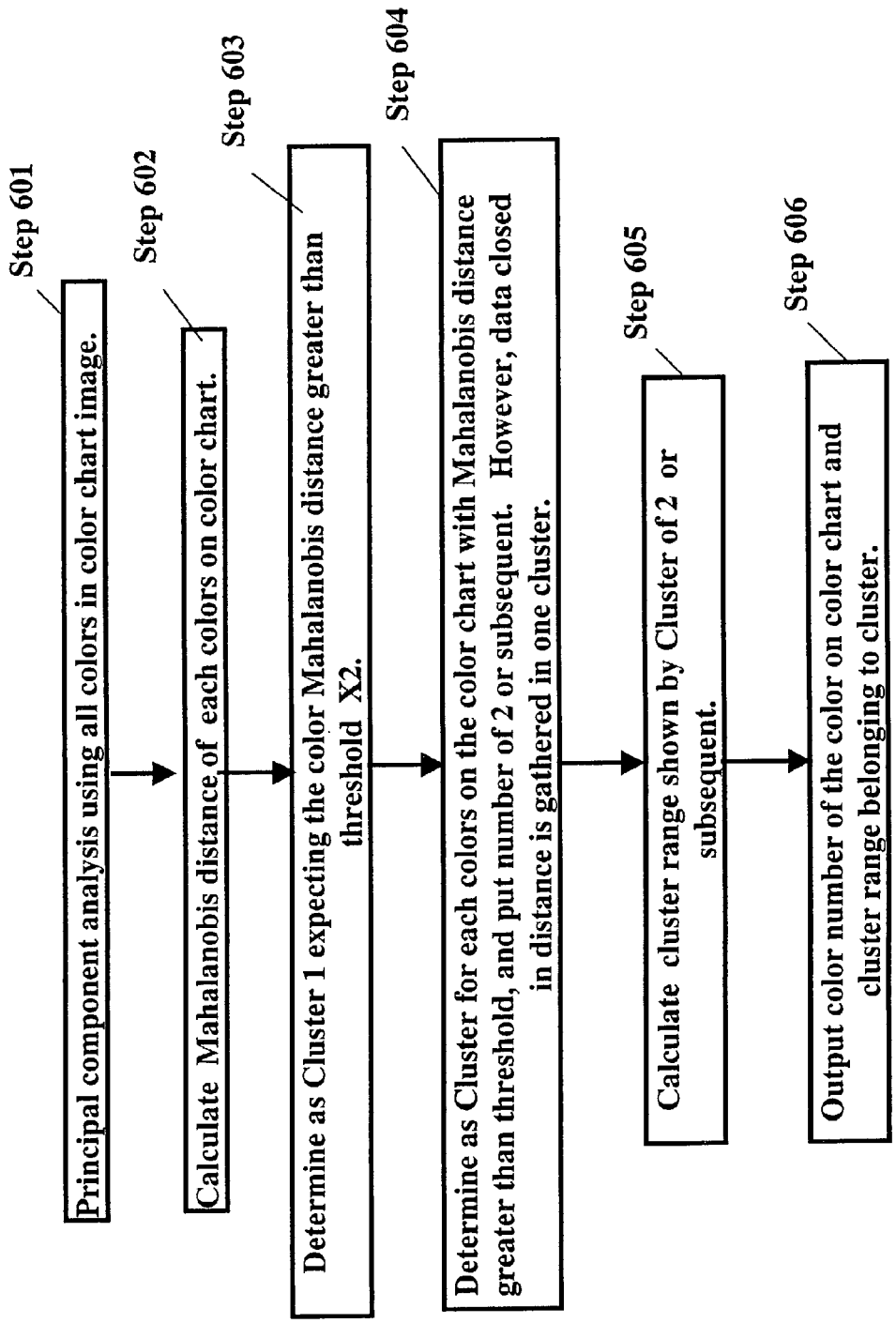
FIG. 6 is a flowchart showing an operation procedure of a cluster fixing section in the device of FIG. 3.

Explanation will be made on a detailed procedure, using a cluster fixing flowchart of FIG. 6.

First, in step 601, all the color chart images e are used to conduct a principal component analysis. In step 602, a Mahalanobis distance is determined on each color of the color chart image e. The color taken a picture in the color chart image e is, hereinafter, referred to as a mark color.

In step 603, a value representative of a confidence interval 90 percent, for example, in a chi-square distribution is taken as a threshold $X^2$, to fix as Cluster 1 a mark color having a Mahalanobis distance smaller than the threshold.

In step 604, of the colors on the color chart great in Mahalanobis distance determined in step 603, grouping is made into those similar in color. The colors grouped are fixed as clusters different from one another, and to be given with cluster numbers as Cluster 2, Cluster 3 . . . .

In step 605, the clusters having a cluster number of 2 and the subsequent are calculated a cluster range the cluster represents. For example, an average color belonging to a cluster is taken, to provide a range designated, for example, in a variable radius from the average color, as a cluster range the cluster represents. Using, for example, a value 0.1 (data is spectral reflectance taking from 0 to 1) as a variable radius, a range of within a radius 0.1 from the average color is given as a cluster range the cluster represents.

In step 606, the cluster, together with the cluster range the cluster represents, fixed above are stored as a cluster parameter f in the cluster storage section 307.

Figure 7:
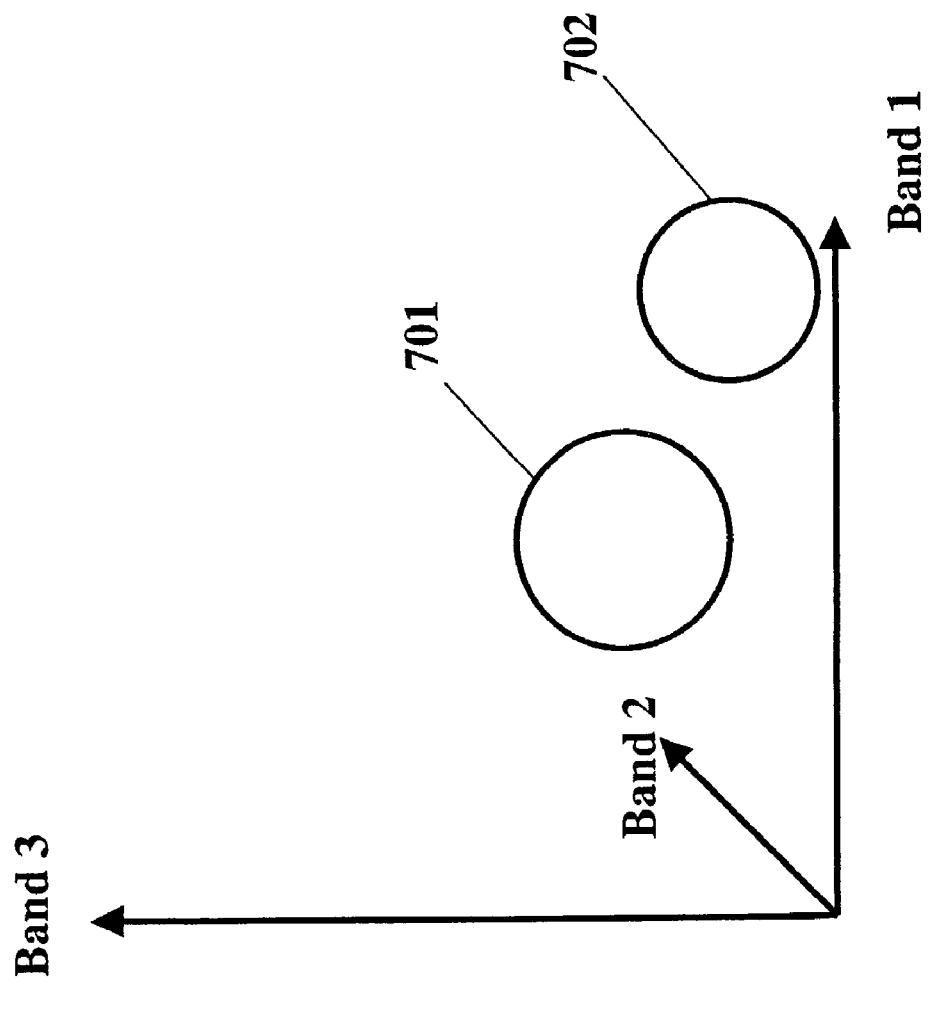
FIG. 7 is a concept figure explaining a concept of a cluster range in the device of FIG. 3.

FIG. 7 shows a concept figure of a cluster range a cluster represents. In this embodiment, although the image space is 31 dimensions of a spectral reflectance space, FIG. 7 shows a case with a three-dimensional space of from Band 1 to Band 3 in order to simplify the explanation. In FIG. 7, a cluster range 701 is a cluster range of Cluster 2 fixed in step 605 while a cluster range, 702 is a cluster range of Cluster 3.

As in the above, by removing away the colors on the color chart abnormal in principal component analysis, the remaining colors nears to a normal distribution. By conducting a principal component analysis with a population of colors approximated to a normal distribution, improved is an expression accuracy with a principal component basis.

Next, explanation will be made on another cluster fixing method, i.e. the method by user designation. For example, in the case with an input image plenty of human skin, the colors on the color chart use much skin color to fix a color approximate to a skin color as one cluster.

Figure 8:
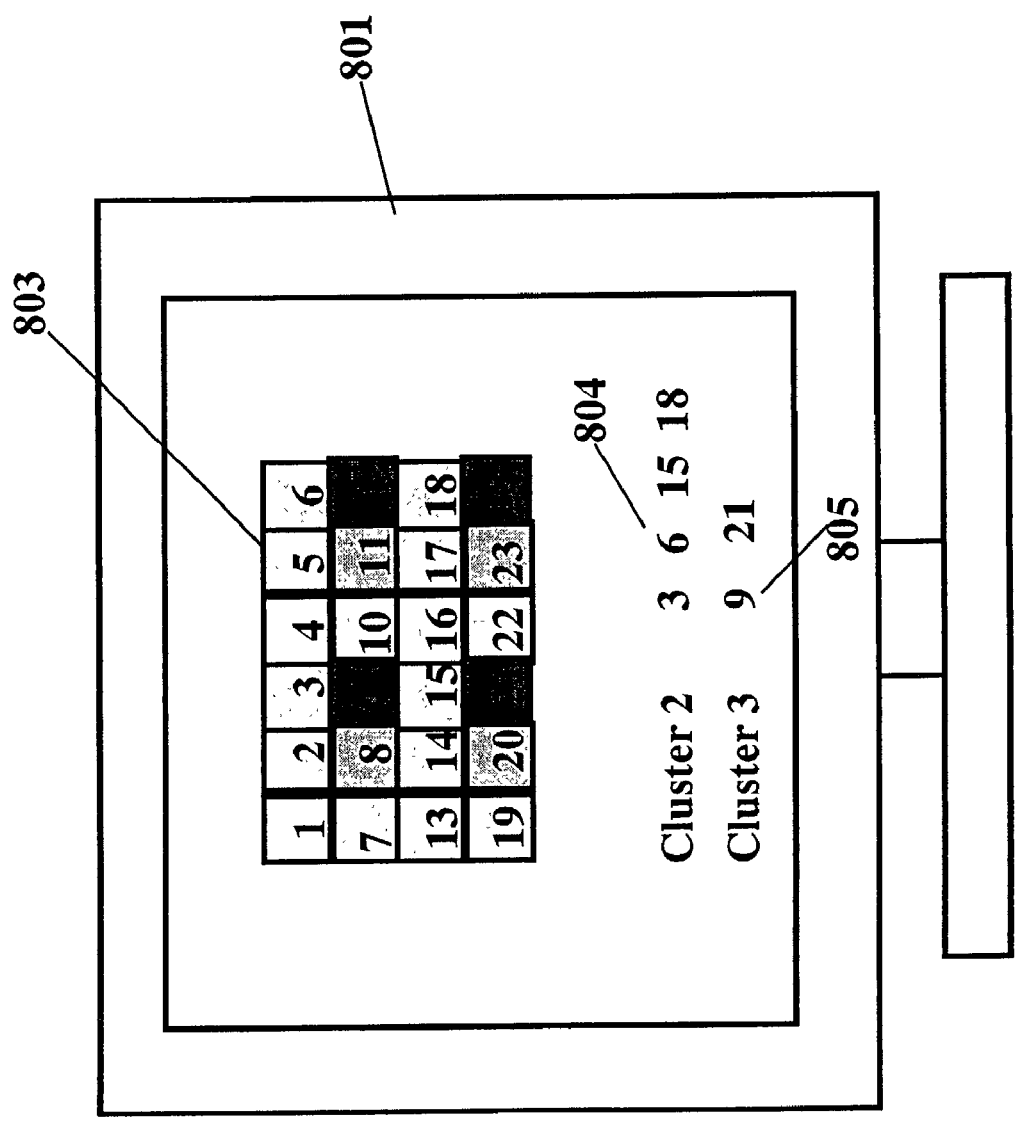
FIG. 8 is a concept figure explaining an operation of clusters by user designation in the device of FIG. 3.

FIG. 8 is an explanatory view that a user is allowed to designate clusters. A color chart image 803 is displayed on a display 801. The colors on the color chart are divisionally assigned into clusters. In this case, the user is to designate the colors of Cluster 2 and the subsequent. For example, Cluster 2 is assigned with a mark color 804 of or around the skin color while Cluster 3 is with a mark color 805 of or around a green of trees. For Cluster 1, automatically registered the remaining of the colors designated by Clusters 2 and 3.

Figure 9:
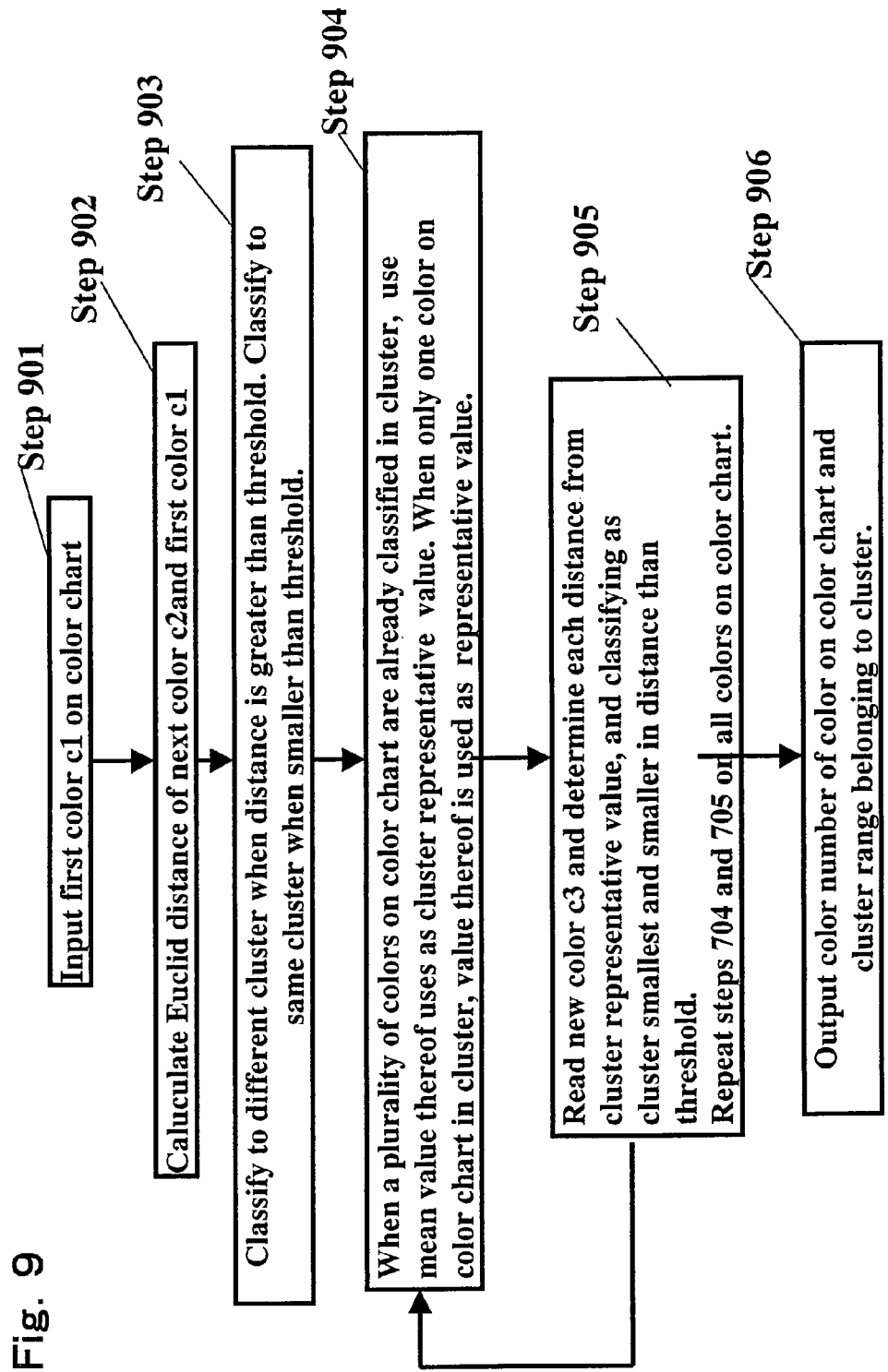
FIG. 9 is a flowchart showing an operation procedure of a cluster fixing section in the device of FIG. 3.

Furthermore, it is possible, as another cluster fixing method, to set one cluster by those of data near in Euclidean distance. This is a cluster classifying method called a Nearest-neighbor or K-mean method. FIG. 9 shows a procedure as an example of same.

In step 901, inputted is a first mark color c1. In step 902, calculated is an Euclidean distance of the next mark color c2 and the first mark color c1. Instep 903, in case an Euclidean distance is smaller than a threshold, fixing is as the same cluster while, when it is greater, classification is to a different cluster. In step 904, a cluster representative value is set. At this time, in case a cluster is classified with a plurality of colors on the color chart, a mean value thereof is taken as a representative value. When there is only one mark color, the data, as it is, is used as a representative value. In step 905, a new color c3 on the color chart is inputted to determine a distance to the cluster representative value, thus making classification to a cluster that is the smallest and smaller than the threshold. In the case of grater than the threshold, it is taken as a new cluster. The steps 904 and 905 are repeated on all the colors cn. Finally, in step 906, outputted is a color chart number belonging to a cluster and cluster range.

The still another method for cluster fixing includes the method to provide clusters by the colors, i.e. red, blue, green and the like, or to geometrically divide a color space. Besides, there is a method for estimation with division into a cluster or color set to be easily estimated when estimating a spectral reflectance image from an image shot by an image input device comparatively less in the number of bands. The cluster or color set used at that time may be used as the clusters of this embodiment.

Next, explanation will be made on the detailed operation of the cluster-base basis fixing section 308. The cluster-based base function g is determined by conducting a principal component analysis of a mark color belonging to each cluster from a cluster parameter f stored in the cluster storage section 307. The principal component analysis may use a variance/covariance matrix or a correlation matrix. In the case of a correlation matrix, besides the basis function, the functions used in normalization such as a mean vector or standard deviation vector are also stored as basis functions g. Although the amount of data increases, the accuracy of expression is further enhanced.

Figure 10:
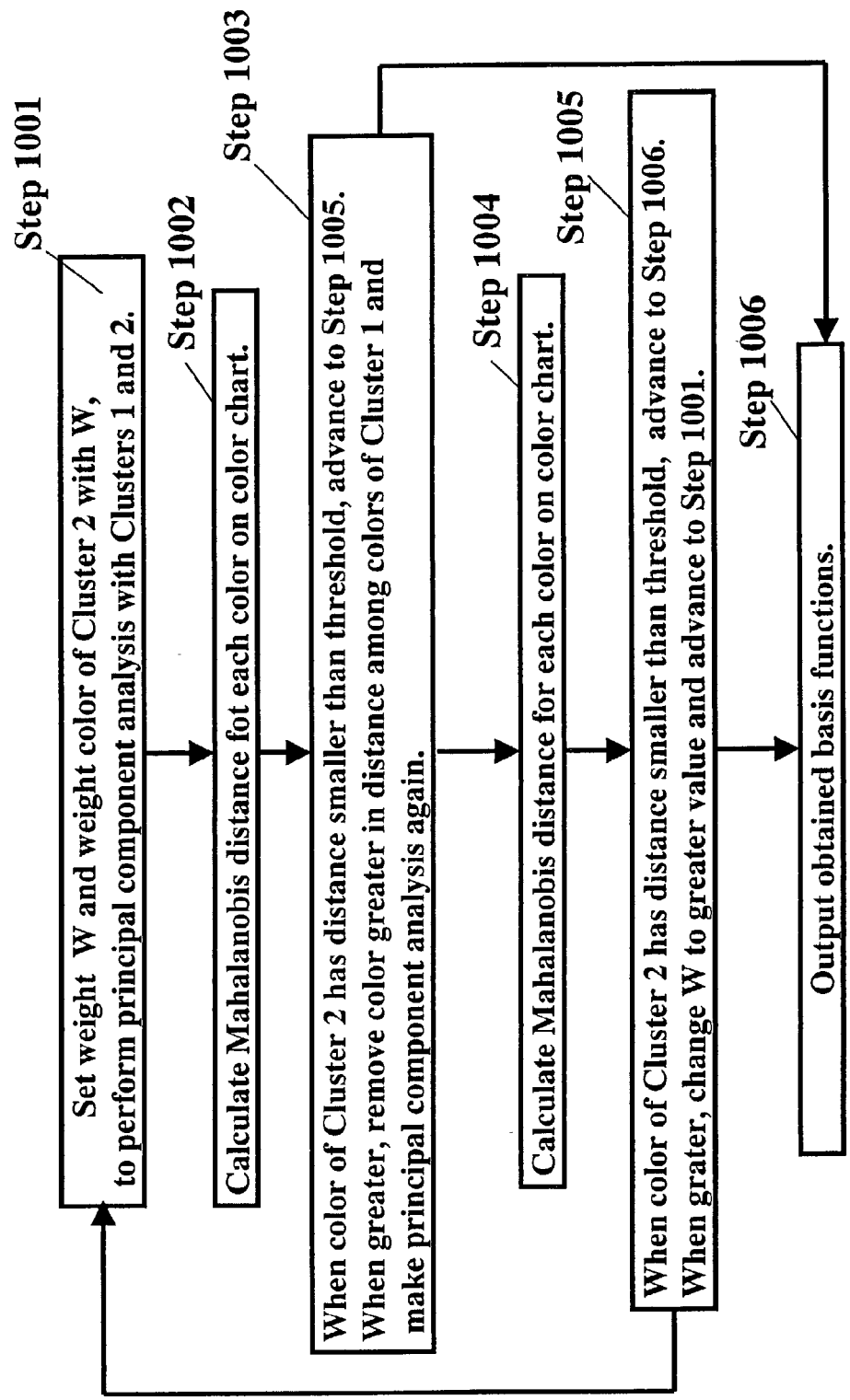
FIG. 10 is a flowchart showing an operation procedure of a cluster-base basis fixing section in the device of FIG. 3.

Incidentally, in the case the number of cluster elements is less, the mark color belonging to the cluster may be weighted in order for determination by a principle component analysis by the use of the colors on the color chart of other than the clusters. The detailed procedure for the same is shown in FIG. 10. Explanation is made on an example of Cluster 2.

In step 1001, a weight W is set to be given for the mark color of within Cluster 2. The mark color of within Cluster 2 is weighted heavier than the mark color of outside Cluster 2, to thereby carrying out a principal component analysis. The mark color of other than Cluster 2, for use in this case, is given as a mark color belonging to Cluster 1. The weighted principal component analysis means to arrange data by overlapping the weight in the number of W in the matrix in Equation 1. The manner of this is shown in FIG. 11. In this manner, it is satisfactory, as shown in FIG. 11, to increase the mark color data of within Cluster 2 by an amount of a weight W in the matrix in Equation 1.

In step 1002, a Mahalanobis distance is determined for the mark color of Cluster 2 and of other than Cluster 2.

In step 1003, comparison is made between the Mahalanobis distance of the mark color of within Cluster 2 and the threshold previously fixed by a chi-square distribution. When the Mahalanobis distance is smaller than the threshold, the process is ended. The basis determined at this time point is determined as a basis function g of Cluster 2, and the process proceeds to step 1005. In the case that is greater, removed is the mark color having a great Mahalanobis distance. A principal component analysis is again made, and the process proceeds to step 1004. In step 1004, determined is a Mahalanobis distance of the mark color of Cluster 2 and of other than Cluster 2.

In step 1005, when the Mahalanobis distance is greater than the predetermined threshold, the value of weight W is increased and the process again returns to step 1001. When that is smaller, the process is ended. The basis determined at this time point is determined as a basis function g of Cluster 2, and the process proceeds to step 1006. In this manner, repetition is made until the Mahalanobis distance of the mark color of within Cluster 2 becomes smaller than the threshold.

In step 1006, the obtained basis functions g of clusters is outputted and stored to the cluster-base basis storage section 310.

The use of the basis function g based on each cluster obtained in the above procedure provides an effect that the accurate reproduction is available, with a low-order basis, for the color taken as a mark color.

Explanation will now be made on the detail operation of the cluster fixing section 313 and basis expressed section 317 serving for compression processing.

The cluster fixing section 313 fixes a belonging cluster, for a pixel of a to-be-compressed image d of from the image storage section 303, on the basis of a cluster range of a cluster parameter f stored in the cluster storage section 307. The cluster range is determined by a cluster center color and radius range radius. Consequently, provided that, for example, Cluster 2 has a center color of $(d2_1, d_2, \ldots, d2_{31})$, the image data being considered is determined belonging to Cluster 2 when Equation 3 is satisfied.

dis<radius $$\text{dis}=\sqrt{(d_1-d2_1)^2+(d_2-d2_2)^2+\ldots+(d_{31}-d2_{31})^2} \qquad \text{Equation 3}$$

The determination of a set is made from Clusters 2 over ton (n: total number of clusters). In the case of not belonging to any of the clusters of 2 and the subsequent, determination is to belong to Cluster 1.

The above process is made on all the pixels of the to-be-compressed image d from the image storage section 303, to generate a cluster image k having the pixel values of fixed cluster numbers.

The cluster image k is delivered, together with the to-be-compressed image d, to the basis expressed section 317. The basis expressed section 317 reads a basis function g out of the cluster-base basis storage section 310 according to a corresponding pixel value of the cluster image k, i.e. cluster number j, and converts each pixel of the to-be-compressed image d into a basis expression value, thus outputting a basis expressed image n. The equation into a basis expression value is shown in Equation 4 in the case of using a variance/covariance matrix in a principal component analysis and in Equation 5 in the case of using a correlation matrix. In Equations 4 and 5, the matrix P is a matrix having basis functions pj1, . . . pjn arranged in the order of higher contribution ratio, wherein x is a value expressing a pixel value of the to-be-compressed image by a column vector and s is a basis expression value (column vector).

$$s=P_j'x \qquad \text{Equation 4}$$

$$s=P_j'(x-\mu_j) \qquad \text{Equation 5}$$

In order to generate a basis expressed image n from the basis expression value obtained in the above procedure, there is a need for quantizing the basis expression value. Many bits are assigned to a first primary component of a basis expressed image n while less bits are assigned to a lower component. For example, 16 bits for a fist primary component, 8 bits for a second primary component, 6 bits for a third primary component, and so on. This is because there is difference in dynamic range to be fallen under, e.g. the first primary component under between −15 and +15, the second primary component under between −5 and +5, the third primary component under between −2 and +2, and so on. Furthermore, because the first primary component has the highest contribution ratio in image reproduction, image quality can be improved by increasing quantization bits.

Figure 12:
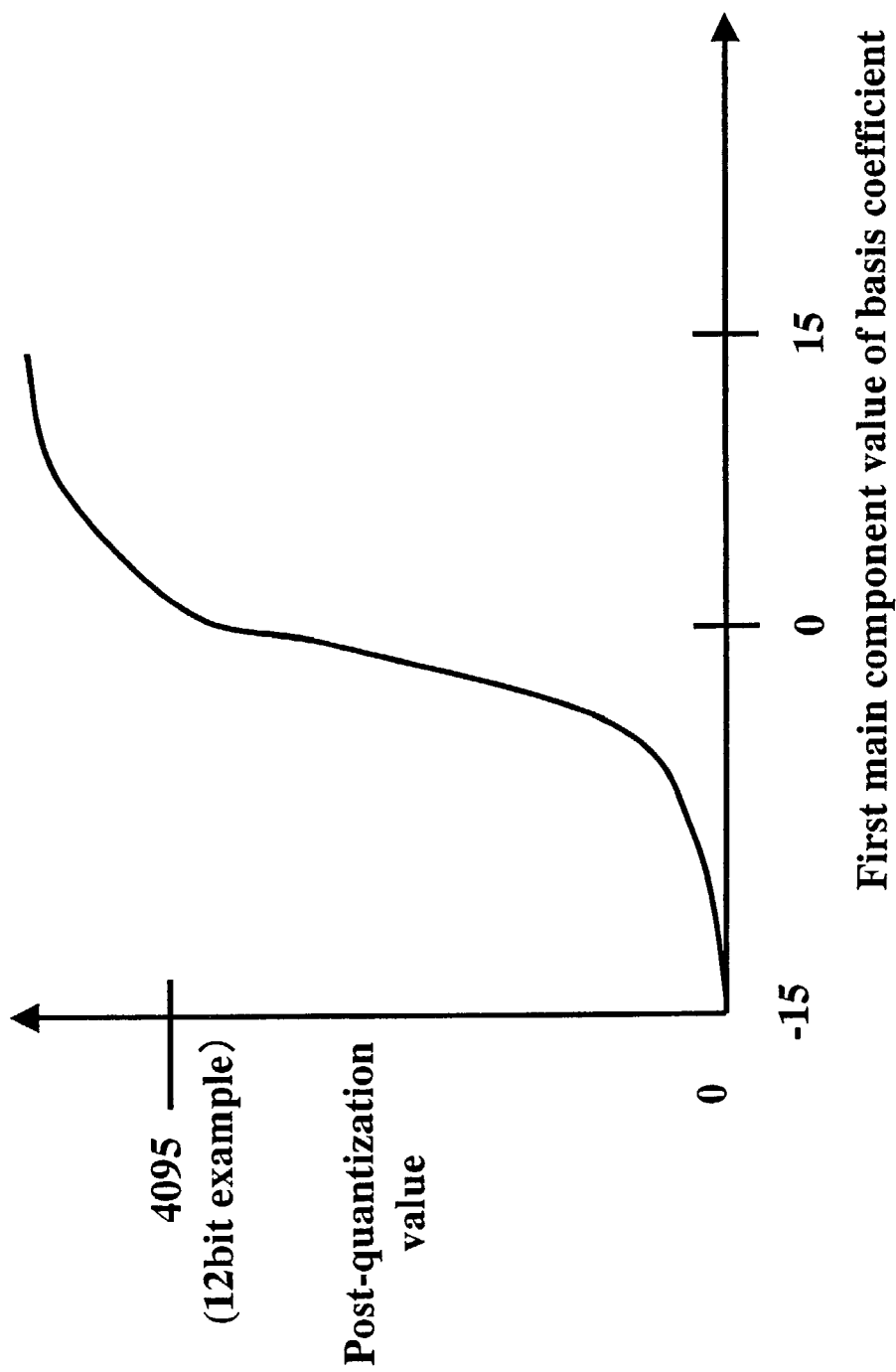
FIG. 12 is a graph showing a non-linear quantization function for a basis coefficient in the device of FIG. 3.

In the quantization method, linear quantization may be made to make a signal having desired bits or non-linear quantization may be made as shown in FIG. 12. In non-linear quantization, when the dynamic range for the first primary component is, for example, given at between −15 and +15, it is rare to take an extreme end value of −15, +15 or the like. Accordingly, quantization is sporadic, and dense quantization is to be efficiently made for the values nearby 0 having comparatively high occurrence ratio.

By carrying out the above on all the pixels of the to-be-compressed image k, generated is a basis expressed image n having a basis expression value s as a pixel value.

By the above process, the to-be-compressed image d generates a cluster image k, a basis expressed image n and a basis function g.

Explanation will be now made on the detailed operation of the cluster image compressing section 315, the divisional compressing section 319 and the basis compressing section 311 for respectively compressing a cluster image k, a basis expressed image n and a basis function g.

The cluster image compressing section 315 compresses a cluster image k. Sub-sampling is used in compressing the cluster image k. Besides sub-sampling, applied may be a conversion coding scheme on tone images, such as discrete cosine transformation, conversion due to wavelet conversion or chaos compression.

Figure 13:
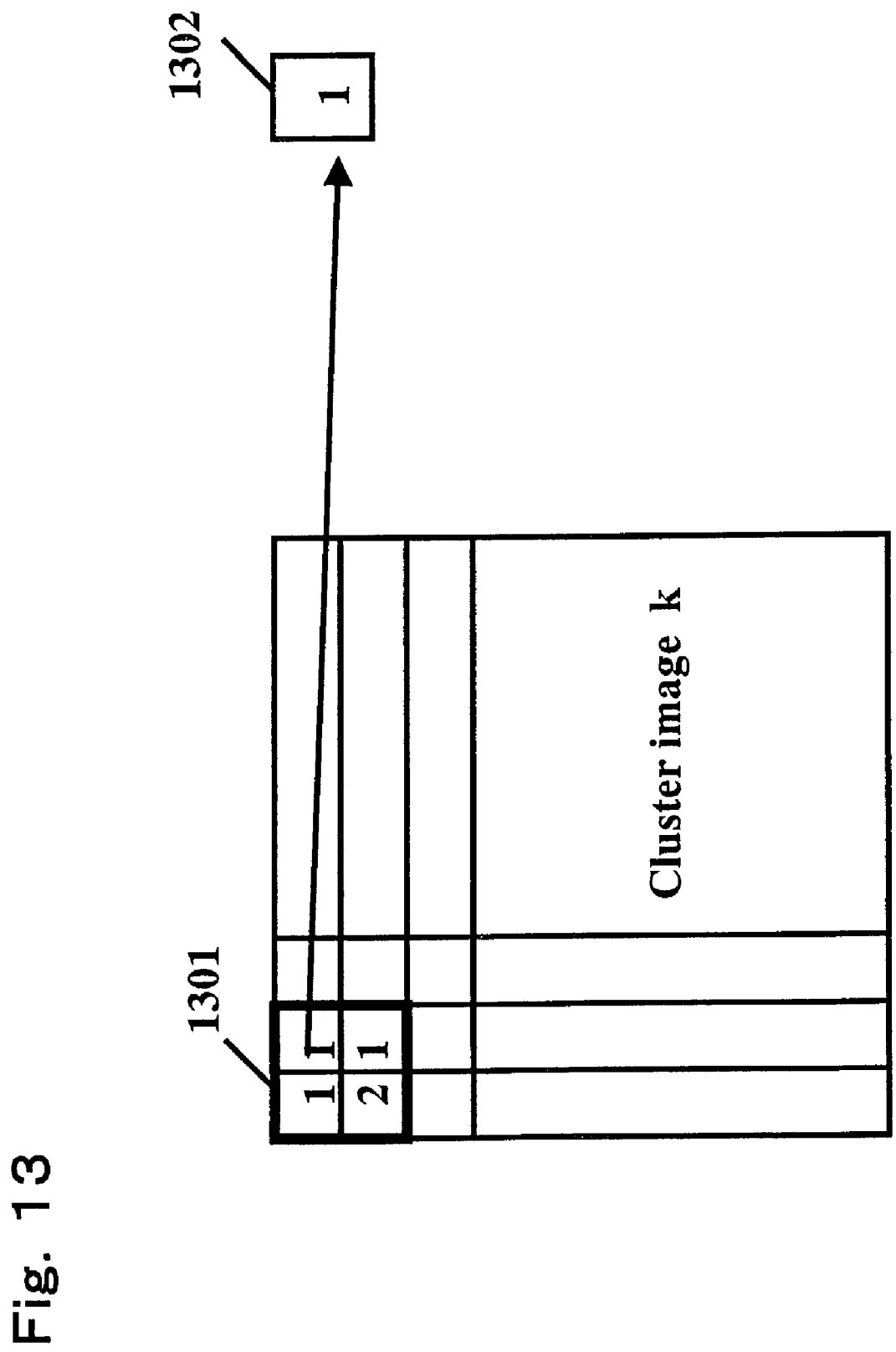
FIG. 13 is a concept figure explaining a concept of sub-sub-sampling in the device of FIG. 3.

Herein, explanation is made on a compression scheme by sub-sampling. In a cluster image k, because the same pixel value frequently continues between the neighboring pixels, compression by sub-sampling is useful. FIG. 13 is an explanatory view of sub-sampling. The vertical two pixels and horizontal two pixels of a cluster image k are taken as one block 1301, to replace the one block 1301 with one pixel 1302. The pixel value, at this time, is determined as a value of a pixel in the upper left in the block. Generally, although replacement is frequently with a mean value within a block, it is not preferred in the nature of cluster image k. This can compress an image to a quarter in size.

Next, explained is the divisional compressing section 119 for compressing a basis expressed image n. The basis expressed image n is a 31-dimensional image. Although the use of all the dimensions provides perfectly reversible compression for the to-be-compressed image d, this if limited to Z dimensions (Z<31) provides non-reversible compression. It is a usual practice to diminish data amount by a limited non-reversible compression. It has been empirically revealed that, for example, with n of nearly 7, a loss is in such a degree that reproduction is possible for various images without encountering conspicuous degradation.

In determining a value Z, there can be considered a method for a user to intentionally determine, it and a method for computation on the basis of compressed data amount (generated code amount). With the method of calculating a value Z from a generated code amount, in the case that a generated code amount is greater than an expected code amount, the value Z is decreased. Conversely, when a generated code amount is smaller than an expected code amount, the vale Z is increased. Due to this, the generated code amount can be placed under control. This method is effective in storing a compressed image in a storage device restricted in storage capacity or in transfer over a transmission line restricted in transfer capacity (bandwidth).

Figure 14:
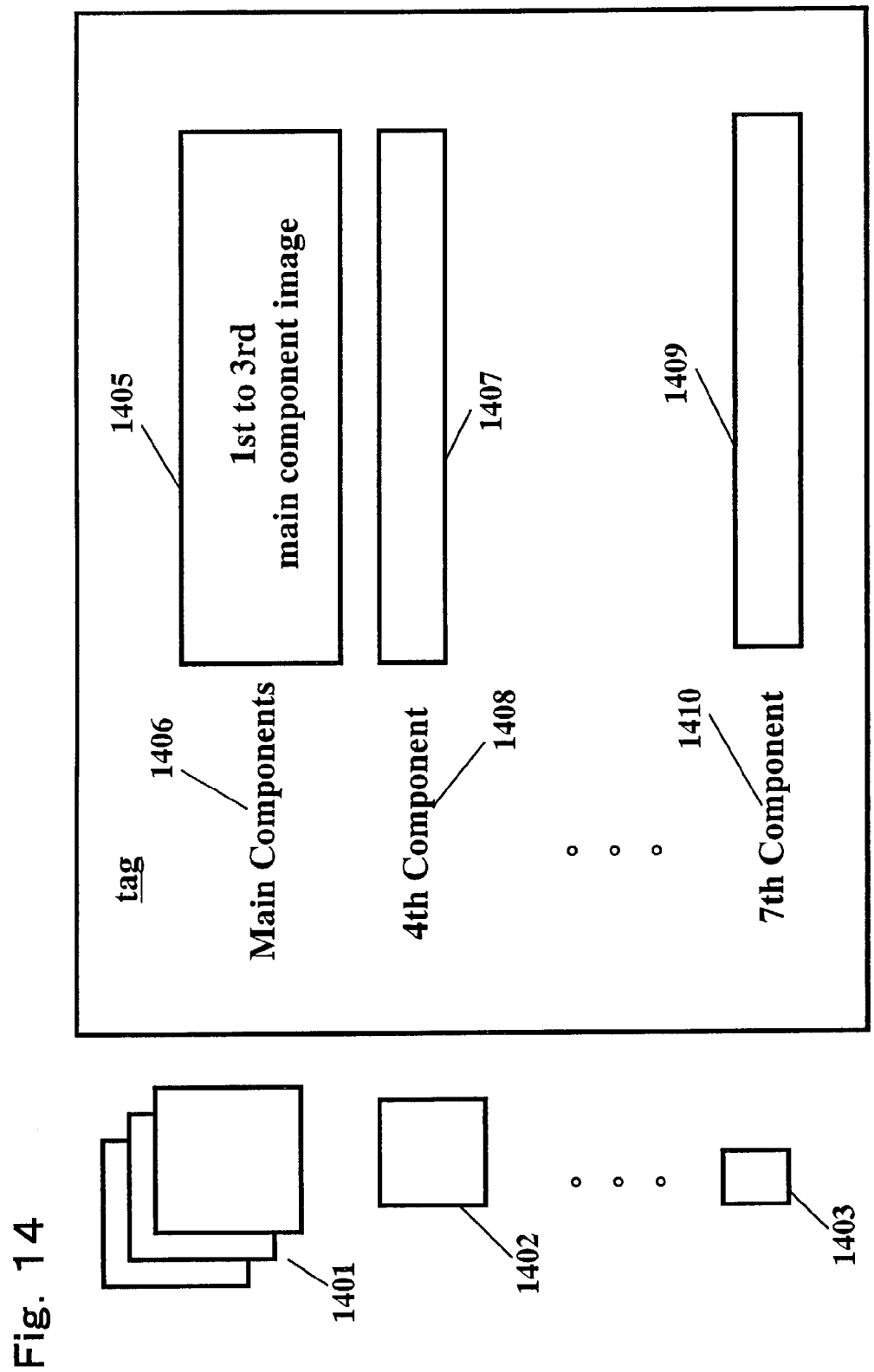
FIG. 14 is a concept figure explaining a concept of image divisional compression in the device of FIG. 3.

In this manner, the basis expressed images n, by the higher-order Z principal component bases controlled according to the data amount, are collectively put with one tag and compressed while the basis expressed images n, by the basis of lower than the higher-order Z are individually put with tags and compressed. FIG. 14 shows an explanatory view of an image format of the same. In FIG. 14, there is shown an example that the basis expressed images 1401 compressed with the first to third principal components, as the higher-order Z principal component bases, are collectively given with a tag 1406 "Main Component" while a basis expressed image 1402 compressed with the fourth principal component to a basis expressed image 1403 of tag 1408, 1410 compressed with the seventh principal component, as the bases of lower than the higher-order Z, are given with "4th Component" to "7th Component".

Although the components of FIG. 14 given with individual tags are described with respective basis expressed images, the basis expressed images can be further compressed by sub-sampling, for example. In FIG. 14, an example is shown on image formats 1405, 1407, 1409 in the case of being further compressed. In the case that the cluster image k is compressed with sub-sampling by the cluster image compressing section 315, the basis expressed image n is compressed with sub-sampling also in the divisional compressing section 319.

Besides compression with sub-sampling, applied may be a conversion coding scheme for tone images, such as discrete cosine transformation, compression due to wavelet conversion or chaos compression. In this case, by decreasing the compression ratio for the image of the higher-order component and increasing the compression ratio for the image of the lower-order component, reproduction accuracy is increased and compression is efficiently made.

The divisional compression in this manner provides an effect to select up to which number of components are to be transmitted or received depending upon reception-displaying terminal performance, transmission network performance, crowdedness or user's instruction.

Figure 15:
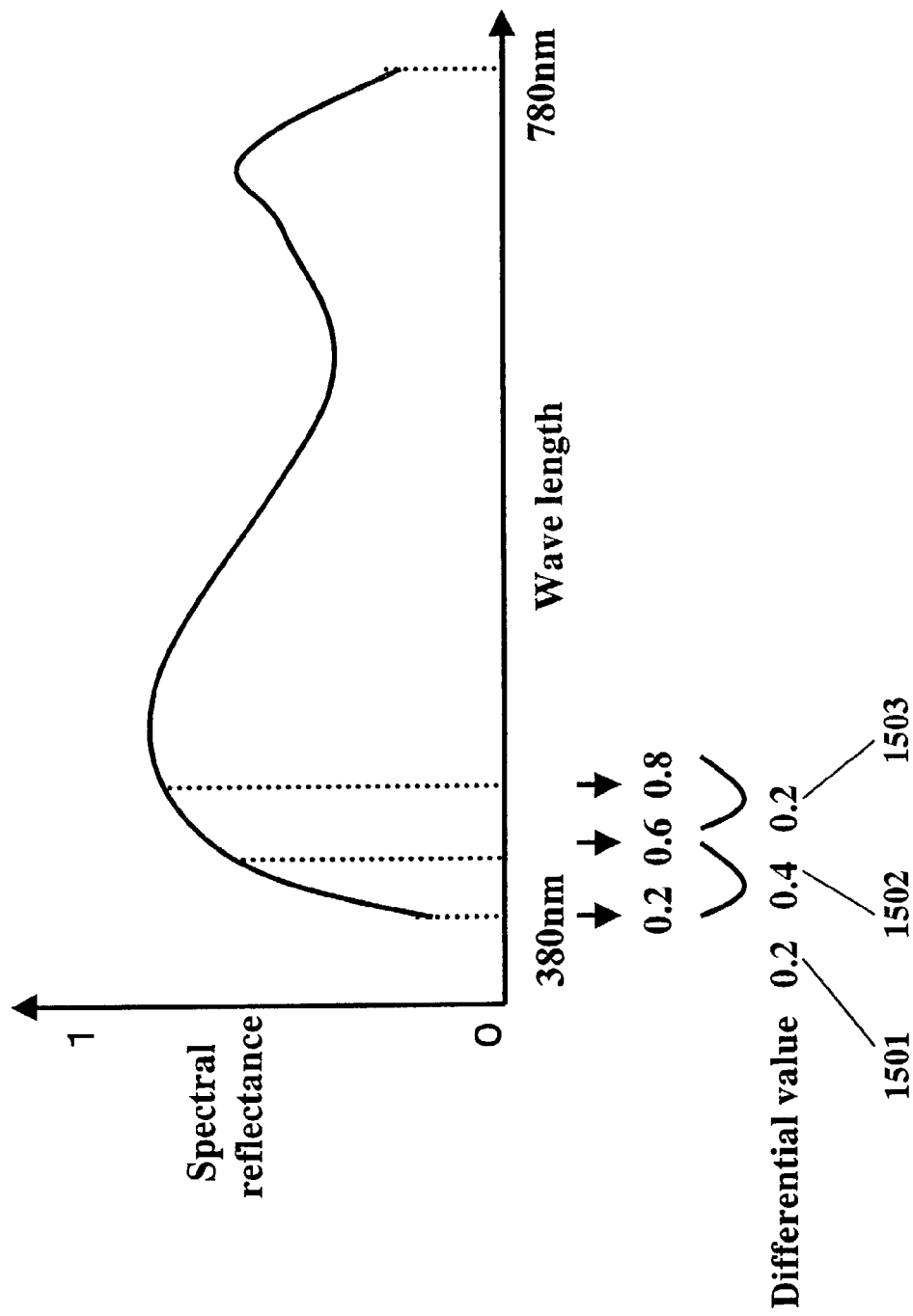
FIG. 15 is a graph explaining a compression example of a basis compressing section in the device of FIG. 3.

Explanation will be now made on the basis compression section 311. The basis functions g, digitized from a continuous value in nature, are close in value between the adjacent ones thereof. For this reason, in compressing the basis functions g, there is a method that sub-sampling is made with a longer sub-sampling interval particularly on lower principal component basis or a method that the first component 1501 of a basis is sent as it is while, for the second component and the subsequent, coding is made on a differential value 1502, 1503 of subtraction of an i-th component from an (i+1)-th component, as shown in FIG. 15.

In this embodiment, the operation of the image compression device 304 of FIG. 3 can be stored on a CDROM to download a program stored on the CDROM onto a personal computer RAM so that the CPU on the personal computer can carry out processes. Meanwhile, the operation of the image compression device 304 may be stored on a ROM within the image input device 202 so that a CPU within the image input device 202 can carry out the processes.

As described above, according to the present embodiment, an image signal is classified into a plurality of clusters to fix which one of the clusters the image signal is fallen under, wherein different image compression processes are made on a cluster-by-cluster basis. Due to this, it is possible to realize an image compression device high in compression ratio and reproduction efficiency.

2. Second Exemplary Embodiment

Embodiment 1 explained an image compression device for compressing a spectral reflectance image as a still image. Embodiment 2 explains a case of compressing a moving image as a set of a plurality of pixels or images different in time position.

In such a case, there is high correlation between the pixels or images different in time position with in a set. There is a high possibility that the image sets high in correlation are to be expressed by the same basis. Utilizing this characteristic, the to-be-compressed image d is given as an image within a set to complete a compression process based on each set instead of making the to-be-compressed image d as respective images within a set to complete a compression process based on each image. Due to this, the same bases of the images of within a set can be bundled into one, thus enhancing compression efficiency. Incidentally, there are the following methods for detecting the sets highly correlated or having the same basis:

(1) scene-change detection on the basis of an image correlation coefficient, (2) detection depending on a difference in basis function between images through determining a basis function based on each image, (3) calculating a basis at a predetermined interval of frames.

Meanwhile, in the case of the image sets limited in items or objects, such as the catalog or picture collection of a certain item (cloth, food or the like) or certain object (forest, sea or the like), there is high possibility that the image sets have the same basis. Utilizing this characteristic in the same manner, in case the to-be-compressed image d is given as an image within a set to complete a compression process based on each set, the same bases within a set can be bundled into one, thus enhancing compression efficiency.

Figure 16:
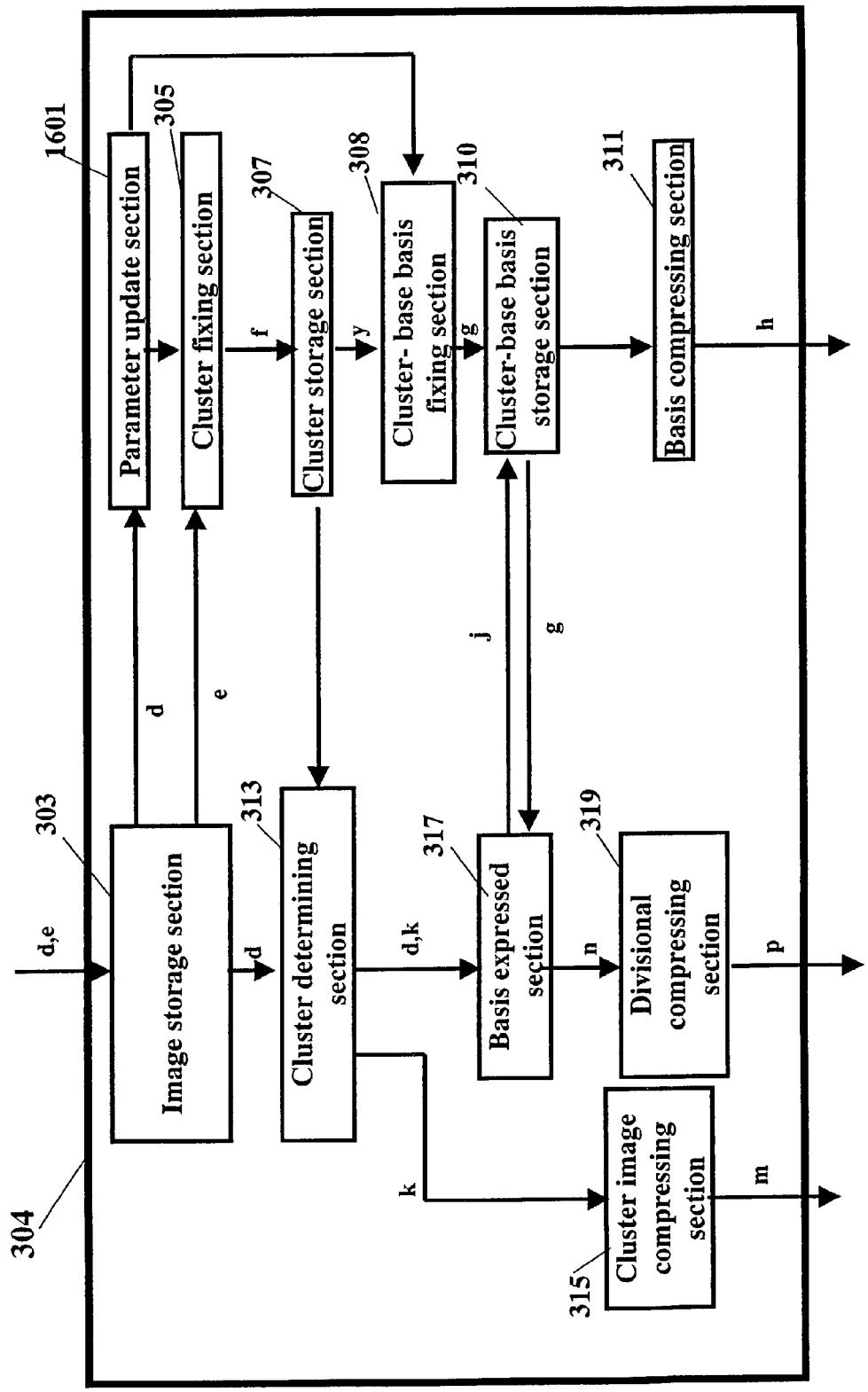
FIG. 16 is a block diagram showing an overall configuration of a moving-image compression device according to Embodiment 2 of the invention.

FIG. 16 is a block diagram of the image compression device 304 in Embodiment 2 of the invention. The same elements as those of FIG. 3 are attached with the same references to omit the explanation thereof. A parameter update section 1601 detects an input of a new image set, to supply the cluster fixing section 305 and cluster-base basis fixing section 308 with an update instruction signal y instructing to update the parameter.

The to-be-compressed image d, a moving image, is inputted frame by frame to the image compression device 304. The to-be-compressed image d inputted in the image compression device 304 is sent to the parameter update section 1601. The parameter update section 1601 determines whether or not a scene change has been done, on the basis of a correlation coefficient to the preceding frame. Unless a scene change has been done, there is no need to update the cluster parameter f and basis function g. Consequently, an update instruction signal y is notified, as non-update, to the cluster fixing section 305 and the cluster-base basis fixing section 308. Accordingly, cluster determination and basis expression is carried out by using the cluster parameter f and basis function g already stored in the cluster storage section 307 and cluster-base basis storage section 310.

On the other hand, in case a scene change has been done, an update instruction signal y is sent to the cluster fixing section 305 and cluster-base basis fixing section 308. The cluster fixing section 305, received the update instruction signal y, newly determines a cluster parameter f. Also, the cluster-base basis fixing section 308 newly fixes a basis function g and stores it to the cluster storage section 307 and cluster-base basis storage section 310. The cluster fixing section 313 makes a cluster determination by the use of a cluster parameter f stored in the cluster storage section 307. The basis expressed section 317 carries out a basis expression by the use of a basis function g stored in the cluster-base basis storage section 310.

The operation of the cluster fixing section 313 and basis expressed section 317 is similar to that of Embodiment 1.

As described above, according to this embodiment, in the case of compressing a moving image as a set of a plurality of pixels or images different in time position, utilized is a high correlation of the pixels or images different in time position of within the set. Instead of taking the to-be-compressed image as the images of within the set to complete a compression process based on each image, the to-be-compressed image is taken as the image of within the set to complete a compression process based on each set. Due to this, the same bases in between the images of within the set can be bundled into one, thus enhancing compression efficiency.

3. Third Exemplary Embodiment

Embodiment 3 concerns an image transmission/reception device for transmitting an image compressed by the method of either Embodiment 1 or 2.

Figure 17:
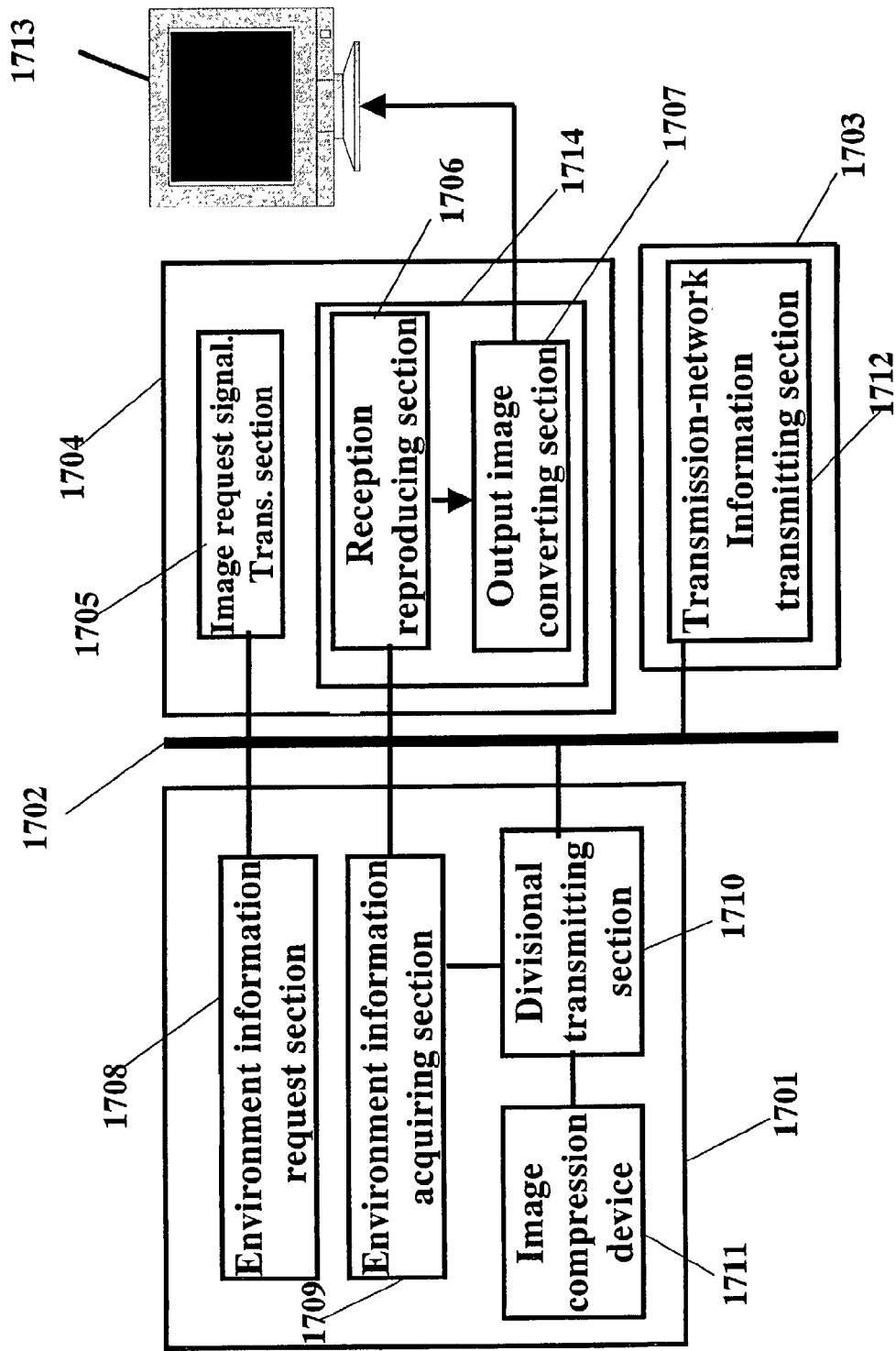
FIG. 17 is a block diagram showing an overall configuration of an image transmission/reception device in Embodiment 3 of the invention.

FIG. 17 is a configuration diagram of an image transmission/reception device to transmit a compressed image. In case a user makes a download request of an image from an image request signal transmitting section 1705 of an image reception device 1704 to an image transmission device 1701, an environment information request section 1708 receives the image request signal from the image request signal transmitting section 1705, and issues an environment information request signal to the image reception device 1704 in a manner to deliver the information of an image output device 1713 as an terminal for image display, and to a repeat terminal 1703 located intermediate between the image transmission device 1701 and the image reception device 1704 in a manner to deliver the information about a performance of or crowdedness over a network 1702. Receiving the request signal, the transmission-network information transmitting section 1712 of the repeat terminal 1703 sends the information of the network 1702 back to the image transmission device 1701. According to the sent-back network information, a divisional transmitting section 1710 selects the information to be transmitted by the information acquired by an environment information acquiring section 1709 of among the images stored, by divisional compression, in an image compression device 1711 corresponding to the image compression device 304 explained in Embodiment 1 or 2, and transmits it to the image reception device 1704. The image compression device 1711 may use different basis functions on a cluster-by-cluster basis as explained in Embodiment 1 or 2, or use the same basis function on all the pixels. The compressed image, compressed on a component-by-component basis, can be divisionally transmitted wherein up to a required component is to be transmitted, as shown in FIG. 16.

The image reception device 1704 receives a compressed image sent by a reception reproducing section 1706 of the image reproduction device 1714 and releases it from compression, then delivering it to an output image converting section 1707. The output image converting section 1707 converts a reception image into a signal value for the image output device 1713, and displays it on the image output device 1713.

In this embodiment, the operations of the image compression device 1711, the image transmission device 1701 and the image reception device 1704 can be stored on a CDROM so that the programs stored on the CDROM can be downloaded onto a RAM of a personal computer and processed by a CPU on the personal computer. Meanwhile, the operation of the image compression device 1711 may be stored on a ROM of the image input device 202 of FIG. 2 so that a CPU in the image input device 202 can be carry out the foregoing process.

As described above, according to the present embodiment, transmission data can be varied in accordance with the information about a transmission destination device or the state of transmission network, thereby efficiently transmitting and receiving multi-dimensional images.

4. Fourth Exemplary Embodiment

Embodiment 4 concerns an image transmission/reception device for transmitting an image compressed by the method of either Embodiment 1 or 2.

Although Embodiment 3 restricted the data amount of a transmission image depending on the performance of the receiver device or the state of a network, Embodiment 4 allows a user to designate the information to send.

Figure 18:
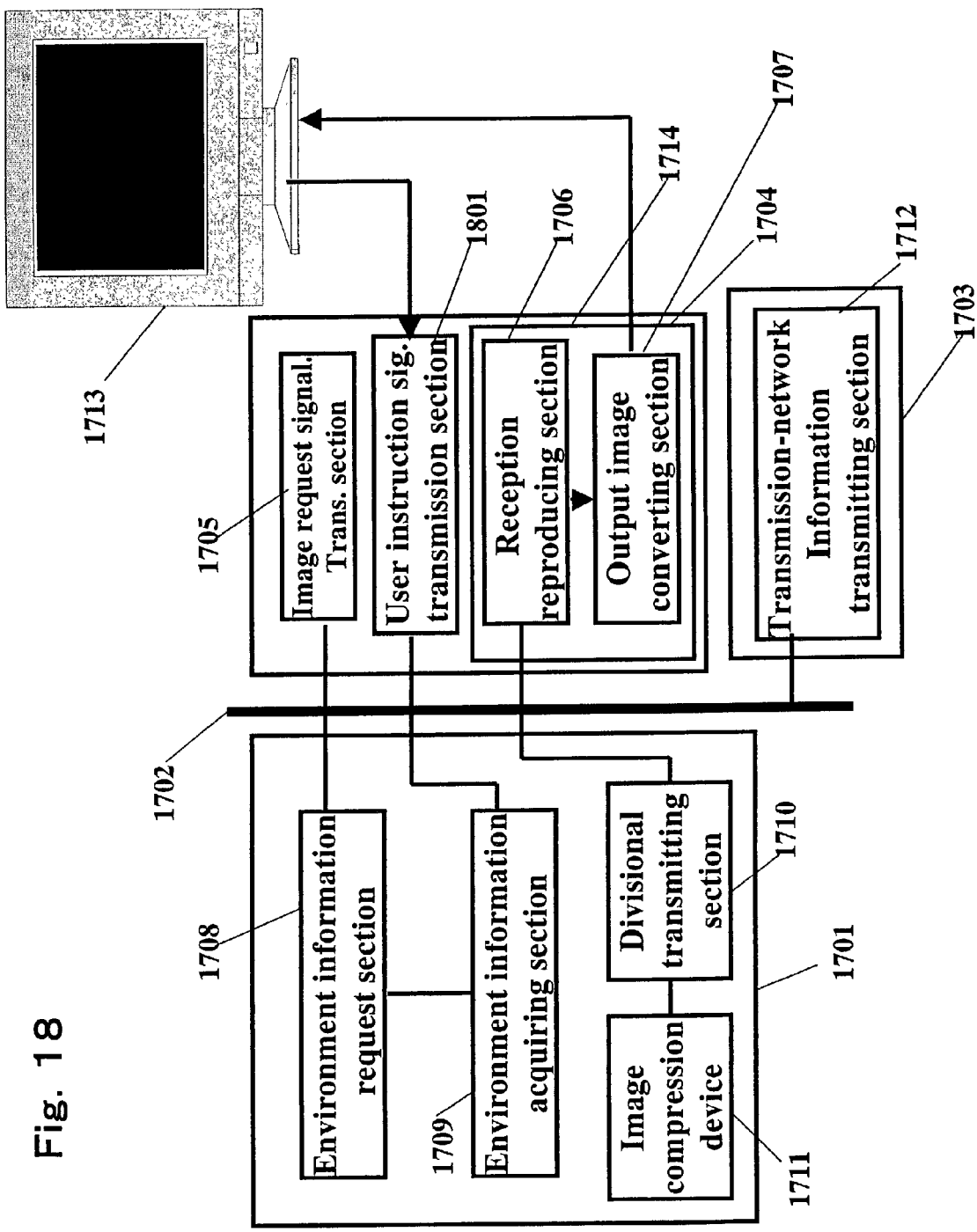
FIG. 18 is a block diagram showing an overall configuration of an image transmission/reception device in Embodiment 4 of the invention.

FIG. 18 is a configuration diagram of an image transmission/reception device for divisional transmission that a user designates the information to be transmitted. In FIG. 18, the same elements as those of FIG. 17 are attached with the same references to omit the explanation thereof. The difference from FIG. 17 lies in that a user instruction signal transmitting section 1801 is provided in the image reception device 1704. The user is allowed to designate, by the user instruction signal transmitting section 1801, a quality of an image to be requested for download. In case high quality is selected, transmitted is a compressed image of up to higher dimensions. Meanwhile, when low quality is selected, transmitted is a compressed image of up to nearly three dimensions.

When a digital image is downloaded with pay, its price differs depending on the quality the user has designated. Otherwise, instead of selecting information upon transmission, the information to be used in reproduction may be selected out of a, downloaded image by the reception reproducing section 1706.

Also, by varying transmission or reception data in accordance with an environmental status upon transmission, multi-dimensional images can be transmitted and received with efficiency.

Also in this embodiment, the operations of the image compression device 1711, the image transmission device 1701 and the image reception device 1704 can be stored on a CDROM so that the programs stored on the CDROM can be downloaded onto a RAM of a personal computer and processed by a CPU on the personal computer. Meanwhile, the operation of the image compression device 1711 may be stored on a ROM of the image input device 202 in FIG. 2 so that a CPU in the image input device 202 can be carry out the foregoing process.

As described above, according to the present embodiment, multi-dimensional images can be transmitted and received with efficiency by making transmission data vary according to a user's instruction.

5. Fifth Exemplary Embodiment

Embodiments 1–4 explained the method of compression and transmission in the case that a spectral reflectance image was a color-space image B not dependent upon the device or lighting in FIG. 2. The present Embodiment 5 explains a method of compressing a spectral reflectance image of after conversion into an output image C such as a multi-primary-color image due to converting a color-space image B not dependent upon a device or lighting into a device value suited for the characteristic of an image output device 207.

In Embodiment 5, the output value converting section 2062 of FIG. 2 is arranged in a rear stage of a color space converting section 203 to convert a color-space image B into a multi-primary-color image C. Thereafter, image compression is done for transmission by an image compression device 304 of the image transmission device 204. On a reception side, a reception reproducing section 2061 restores a compressed image from a transmission signal to display and print it on the output device 207.

The method of compressing a multi-primary color image C is similar to that of Embodiment 1. The difference from Embodiment 1–4 lies in a transmission method in the case of divisionally compressing a multi-primary color image.

Figure 19:
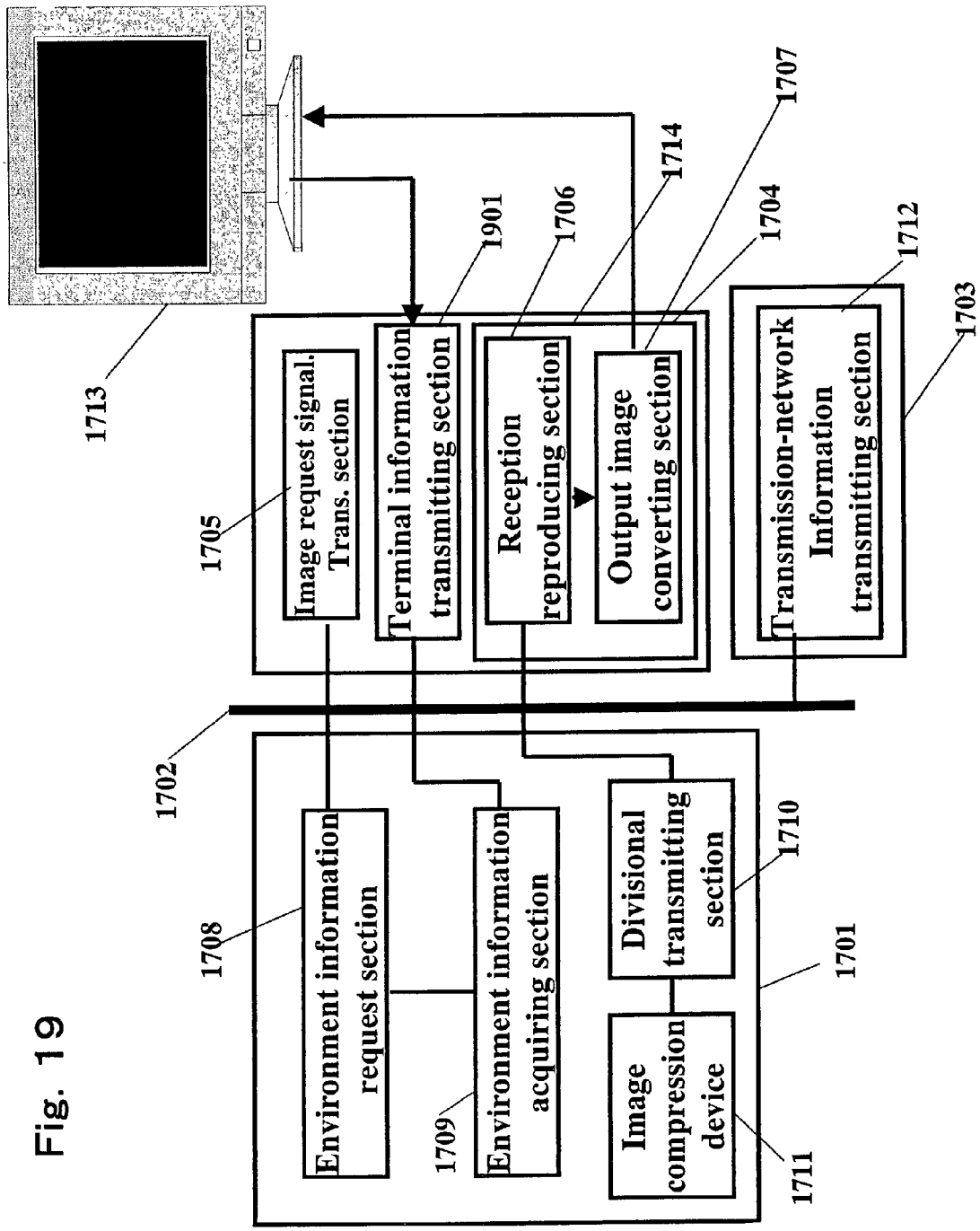
FIG. 19 is a block diagram showing an overall configuration of an image transmission/reception device in Embodiment 5 of the invention.
Figure 20A:
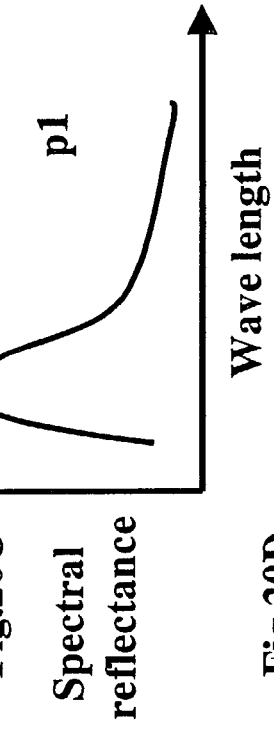
FIG. 20 is a graph explaining a concept of a cluster-base basis of an image compression device in Embodiment 6 of the invention.
Figure 20B:
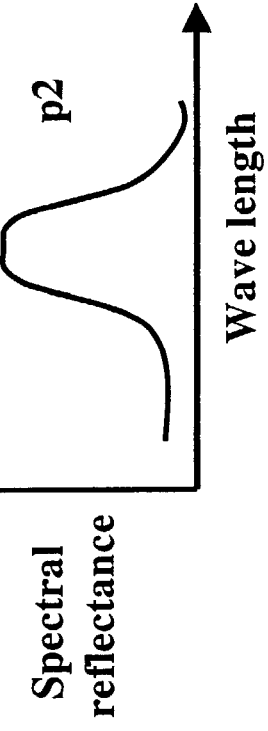
Figure 20C:
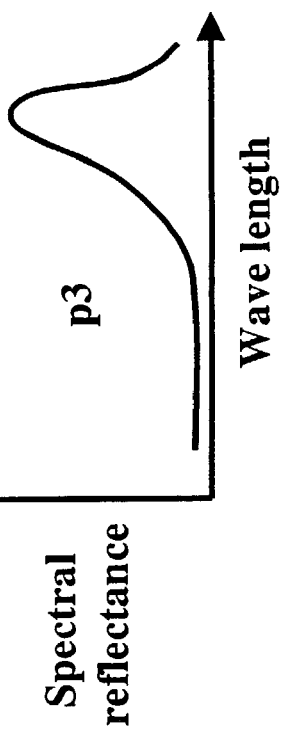
Figure 20D:
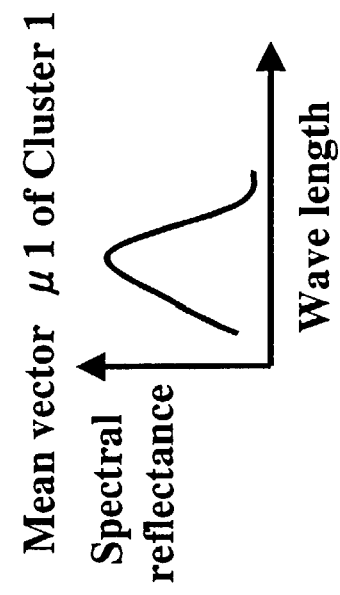
Figure 20E:
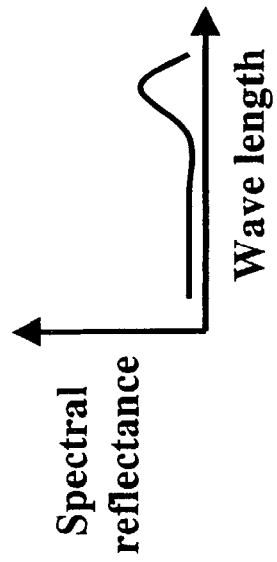

FIG. 19 shows a configuration example of an image transmission/reception device for multi-primary-color image divisional transmission and reception in Embodiment 5 of the invention. In FIG. 19, the same elements as those of FIG. 17 are attached with the same references to omit the explanation thereof. The difference from FIG. 17 lies in that a terminal information transmitting section 1901 is added. The terminal information transmitting section 1901 transmits the information of an image reception device 1704 to the image transmission device 1701 according to an instruction of an environment information request section 1708 of the image transmission device 1701. Terminal information includes, for example, the number of primary colors to be displayed, such as whether the image output device 1713 is a three-primary-color display device or a six-primary-color display device, maximum luminance value and dynamic range. In the case that the number of primary colors to be displayed is three, it is satisfactory to transmit an image of up to three dimensions. Accordingly, it is satisfactory to transmit a main component tag 1406 in the format of FIG. 14.

The terminal information transmitting section 1901 receives an environment information acquisition signal from the environment information request section 1708 and sends the information on the performance or primary color count of the image reception device 1704 back to the image transmission device 1701. The divisional transmitting section 1710 selects the information to be transmitted from among the images stored, by divisional compression, in the image compression device 1711 according to sent-back terminal and network information, and sends it to the image reception device 1704. For example, selection is made up to what order of primary component of basis expressed image n transmission is to be done or up to what tag information transmission is to be done.

In this manner, the present embodiment can eliminate the uselessness, such as transmission of an image of up to seven primary colors despite the display appliance is of three primary colors, by transmitting terminal information previously acquired.

In also this embodiment, the operations of the image compression device 1711, the image transmission device 1701 and the image reception device 1704 can be stored on a CDROM so that the programs stored on the CDROM can be downloaded onto a RAM of a personal computer and processed by a CPU on the personal computer. Meanwhile, the operation of the image compression device 1711 may be stored on a ROM of the image input device 202 in FIG. 2 so that a CPU in the image input device 202 can carry out the foregoing process.

As described above, according to the present embodiment, transmission data can be varied depending upon the information about a image display device, thereby efficiently transmitting and receiving multi-dimensional images.

6. Sixth Exemplary Embodiment

Embodiment 6 uses the cluster-base mean vectors in the image compression device 304 of FIG. 3.

The block diagram of the image compression device according to Embodiment 6 is the same as that of FIG. 3 in Embodiment 1. The difference from Embodiment 1 lies in the operation of the cluster-base basis fixing section 108.

Embodiment 1 fixed a basis function g by a principal component analysis using a mark color belonging to a cluster. In fixing a basis function g, there can be considered a method to fix a basis function g by using, as it is, a mark color belonging to a cluster, and a method to determine a basis function g after performing a normalization wherein a mean vector is determined from a mark color belonging to a cluster to subtract the mean vector from the mark color. The former is the case to perform a principal component analysis with a variance/covariance matrix while the latter corresponds to the case to carry out it with a correlation matrix. The former fixes a basis function g in a manner passing through the origin at all times. In contrast, the latter fixes a basis function g in a manner passing a data center, thereby increasing the accuracy of reproduction by a basis function g.

Accordingly, this embodiment, in a method of expressing the value normalized in the latter by a basis function g, previously determines a mean vector from a mark color belonging to a cluster, to thereby use the same basis function g for expressing normalized data on all the clusters.

FIG. 20 is an explanatory view of a basis function g. The mean vectors $\mu_j$ are fixed on a cluster-by-cluster basis, as shown in FIGS. 20A and 20B. On the other hand, because the basis functions g are common in all the clusters, the basis functions as shown in FIGS. 20C–20E are set up in advance. Namely, although the mean vectors $\mu_j$ are different between the clusters j, the basic matrix $P_j$ is common in the all.

In also this embodiment, the operations of the image compression device 304 can be stored on a CDROM so that the program stored on the CDROM can be downloaded onto a RAM of a personal computer and processed by a CPU on the personal computer. Meanwhile, the operation of the image compression device 304 may be stored on a ROM of the image input device 202 of FIG. 2 so that a CPU in the image input device 202 can be carry out the foregoing process.

As described above, according to the present embodiment, by making the same the basis functions on a cluster-by-cluster basis, an image compression device can be realized which is reduced in reproduction accuracy but having a high compression ratio.

7. Seventh Exemplary Embodiment

Embodiment 7 is to compress a basis expressed image n by the use of vector quantization in the image compression device 304 of FIG. 3. The block diagram of an image compression device of Embodiment 7 is the same as that of FIG. 3 in Embodiment 1. The difference from Embodiment 1 lies in the operation of the divisional compressing section 119.

Although Embodiment 1 compressed the basic expression image n by using discrete cosine transformation and sub-sampling, Embodiment 7 carries out compression with using vector quantization. The basis expressed image n of Embodiment 7 is characterized in that expression is made as one basis expressed image n even where the clusters belonging are different between pixels, i.e. even where the basis functions g are different. The basis expressed image n is vector-quantized.

Figure 21:
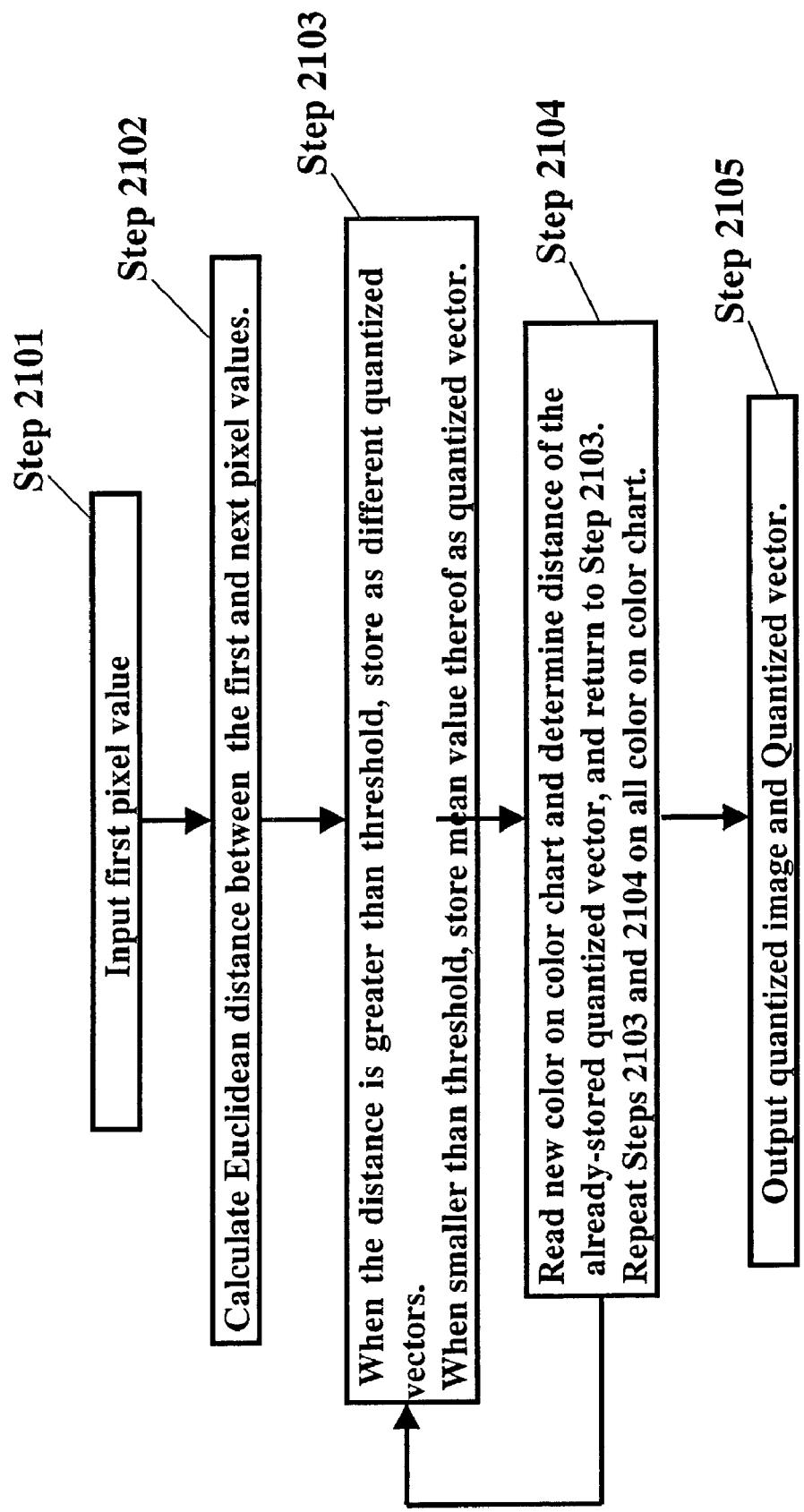
FIG. 21 is a flowchart explaining a procedure of vector quantization by an image compression device in Embodiment 7 of the invention.

FIG. 21 is an explanatory view of a procedure of vector quantization. In step 2101, inputted is a first pixel value (vector value) of a basis expressed image n of up to seven dimensions. In step 2102, calculated is an Euclidean distance between the first pixel value and the next pixel value. In step 2103, when this distance is greater than a threshold, the respective ones are stored as different quantized vectors. When smaller than the threshold, stored is a mean value thereof as a quantized vector. In step 2104, the next pixel value is further read in, to determine a distance to a quantized vector already stored. Similarly, when the distance is greater than a threshold, new quantized vectors are stored. The above procedure is repeated on all the pixels. In step 2105, finally outputted are an image the basis expressed image n has, as a pixel value, a quantized-vector number value (this is referred to as a quantized image) and a quantized vector column.

Figure 22:
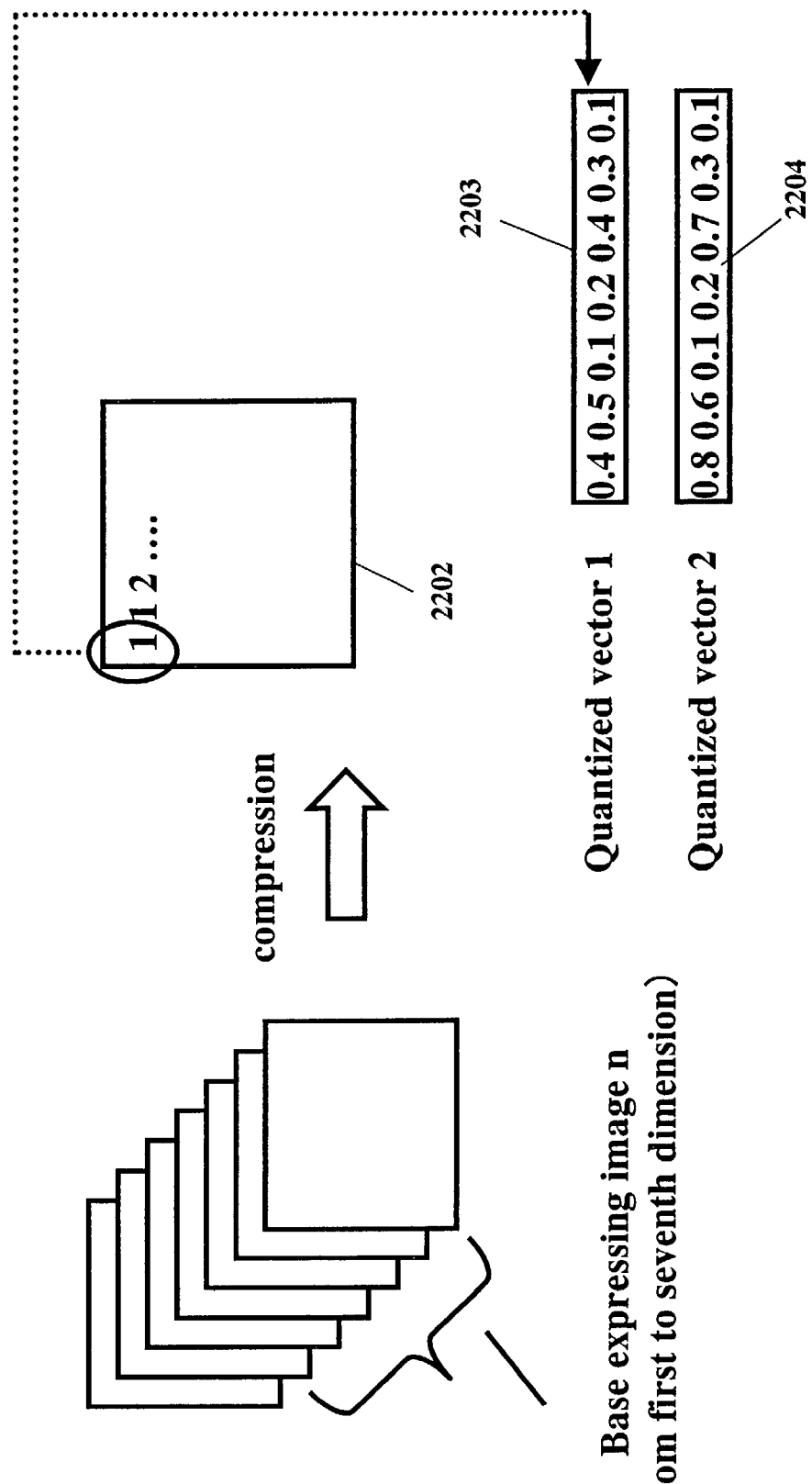
FIG. 22 is a concept view explaining a concept of vector quantization by the image compression device in Embodiment 7 of the invention.

FIG. 22 is an explanatory view of compression due to vector quantization. The basis expressed image n is compressed into a quantized image 2202 having, as a pixel value, a quantized-vector number value and quantized-vector columns 2203, 2204. By thus performing vector quantization after division into clusters, an image is expressed by the quantized vectors in the number corresponding to a product of the number of clusters of a cluster image and the number of quantized vectors. Due to this, as compared to the case that the to-be-compressed image is directly vector-quantized without a division into clusters, the number of quantized vectors is satisfactorily less in the number. Thus, it is possible to realize a compression having high compression ratio and reproduction accuracy.

Incidentally, this embodiment exemplified the case that the basis coefficient of up to seven dimensions are quantized at one time. However, in the case of carrying out divisional compression shown in Embodiment 1, the main component of up to three dimensions only may be vector-quantized while the components of four dimensions and the subsequent be individually compressed and described with the format shown in FIG. 14.

Figure 23:
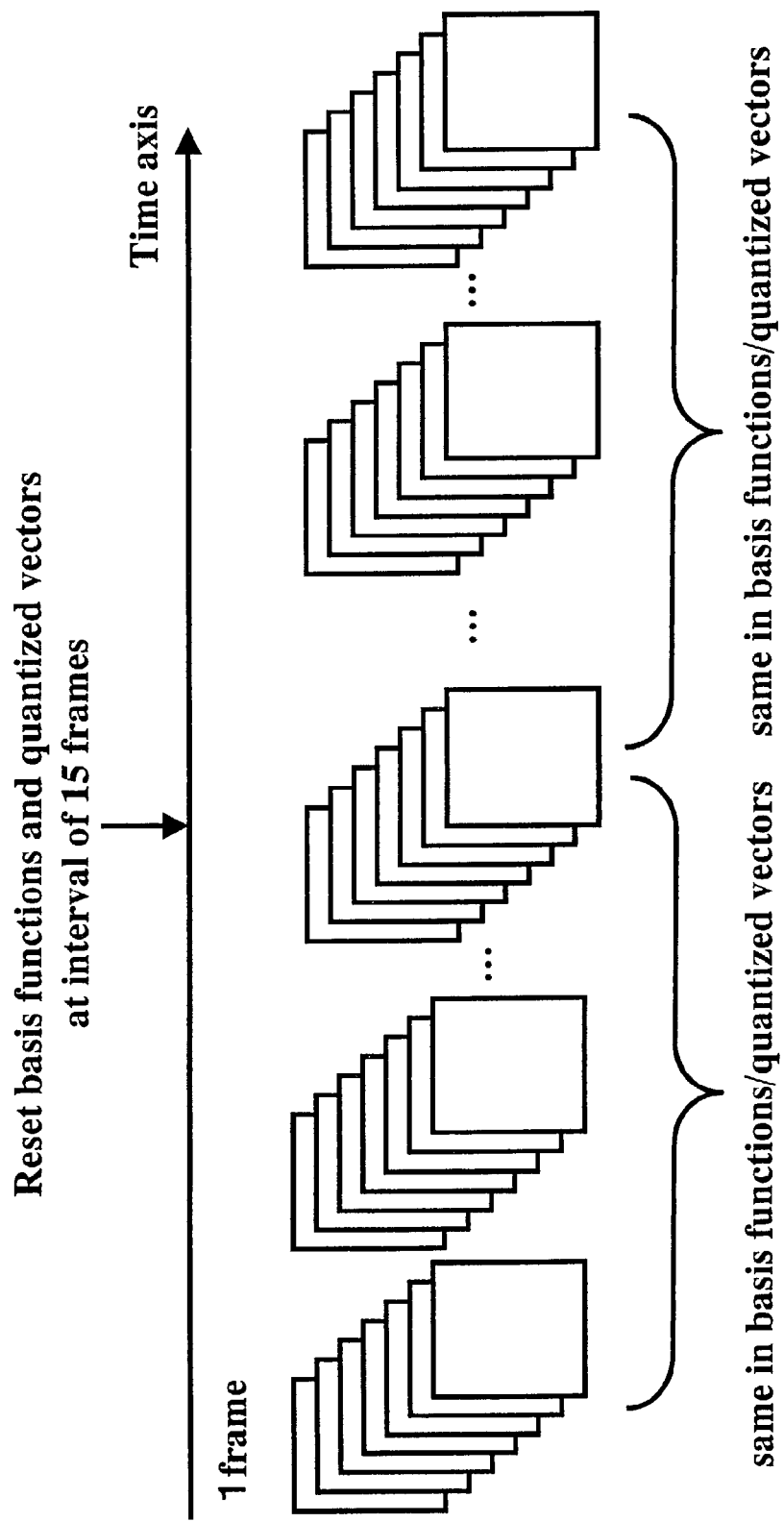
FIG. 23 is a concept view explaining a principle of moving-image compression by the image compression device in Embodiment 7 of the invention.

Meanwhile, in the case that the to-be-compressed image is a moving image, the quantized vectors, clusters and basis functions based on each cluster may be reset at an interval of a fixed number of frames (e.g. of 15 frames), as shown in FIG. 23. Meanwhile, in case a scene change is recognized from a moving image, reset on each scene, to realize a more efficient compression.

Also in this embodiment, the operation of the image compression device 304 can be stored on a CDROM so that the program stored on the CDROM can be downloaded onto a RAM of a personal computer and processed by a CPU on the personal computer. Meanwhile, the operation of the image compression device 304 may be stored on a ROM of the image input device 202 in FIG. 2 so that a CPU in the image input device 202 can carry out the foregoing process.

As described above, according to the present embodiment, by previously dividing an image into clusters to quantize the basis expressed images expressed by different basis functions on a cluster-by-cluster basis using vector quantization method, an image compression device can be realized that is high in reproduction accuracy and high in compression ratio.

8. Eighth Exemplary Embodiment

Embodiment 8 concerns an image uncompression apparatus which reproduces an image compressed by any of the methods in Embodiments 1, 2, 6 and 7 to display it on an image output device.

As shown in FIGS. 17–19, an image reproduction device 1714 is configured with a reception reproducing section 1706 and an output image converting section 1707. The reception reproducing section 1706 is to receive and reproduce a compressed image while the output image converting section 1707 is to convert a reproduced image into an image signal for the image output device 1713.

The compressed image may be any of a multi-spectral image, a color-space image not dependent upon an apparatus or an apparatus and lighting, and a multi-primary-color image. The present embodiment exemplifies a spectral reflectance image.

Figure 24:
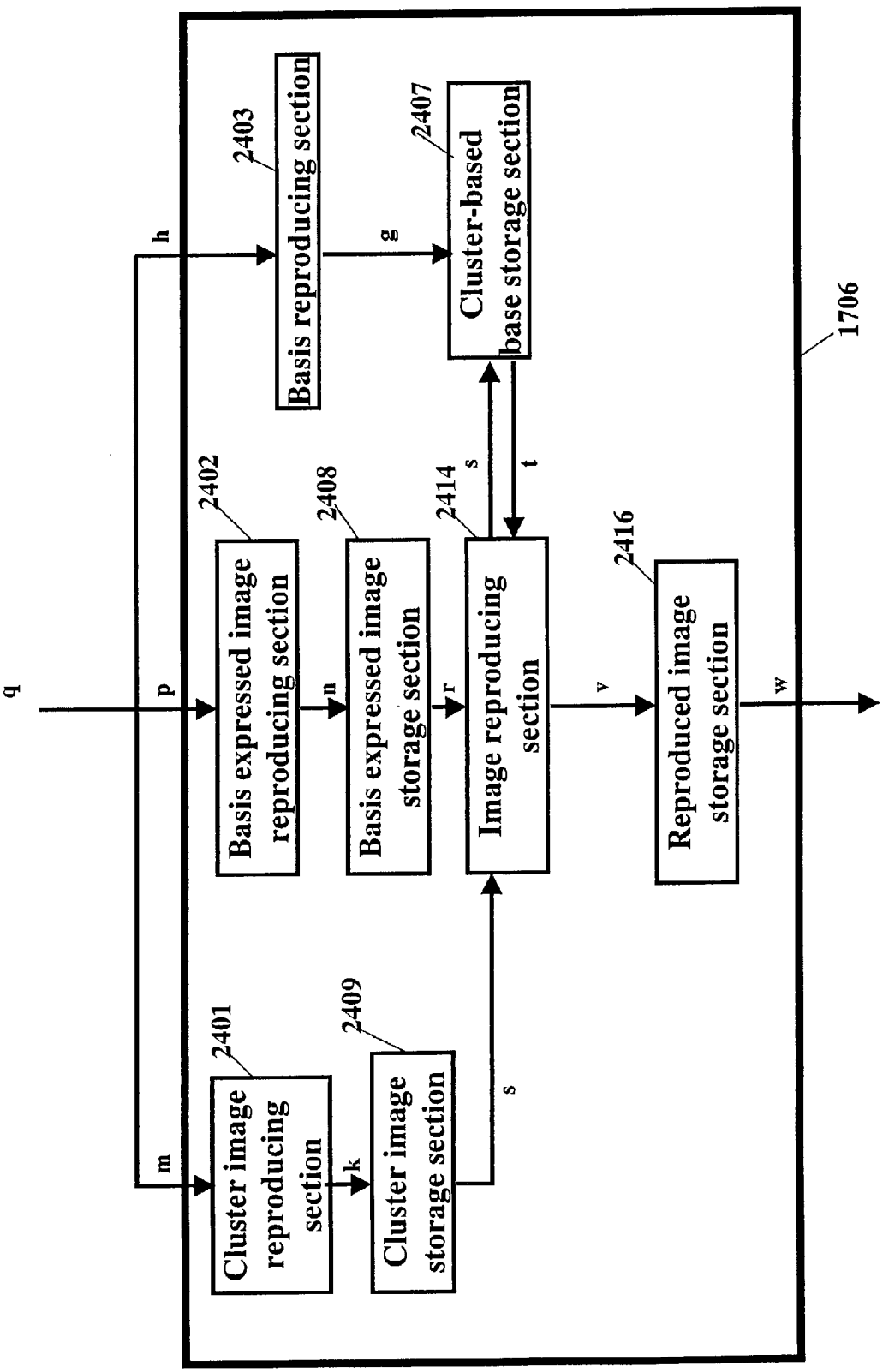
FIG. 24 is a block diagram of a reception reproducing section of an image uncompression apparatus in Embodiment 8 of the invention.

FIG. 24 is a block diagram of the reception reproducing section 1706 in the image reproduction device 1714. The reception reproducing section 1706 is inputted by a compressed image q from the compressed-image storage section 321 of FIG. 3. The compressed image q is structured with a compressed cluster image m, a compressed basis expressed image p and a compressed basis h. Of the compressed image q, the compressed cluster image m is restored from compression in the cluster image uncompression section 2401. The restored cluster image k is stored in the cluster image storage section 2409. The compressed basis expressed image p is restored from compression in the basis expressing image uncompression section 2402. The restored basis expressed image n is stored in the basis expressed image storage section 2408. The compressed basis h is restored from compression in the basis reproducing section 2403. The restored cluster-base basis function g is stored in the cluster-base basis storage section 2407.

The pixel value r being considered read, pixel by pixel, out of the basis expressed image storage section 2408 and the cluster value s, corresponding to the pixel value being considered, read, pixel by pixel, out of the cluster image storage section 2409 are supplied to the image uncompression section 2414. The image uncompression section 2414 is supplied by a basis function t corresponding to a cluster value s read out of the cluster-base basis storage section 2407 by a designated cluster value s corresponding to a pixel value r being considered to be delivered to the cluster-base basis storage section 2407. The image uncompression section 2414 uses the basis function t to convert the pixel value r being considered into a pixel reproduction value v being considered, and sequentially stores it to the reproduced-image storage section 2416. The reproduced-image storage section 2416 outputs a reproduced image w after completing the process on all the pixels.

Figure 25:
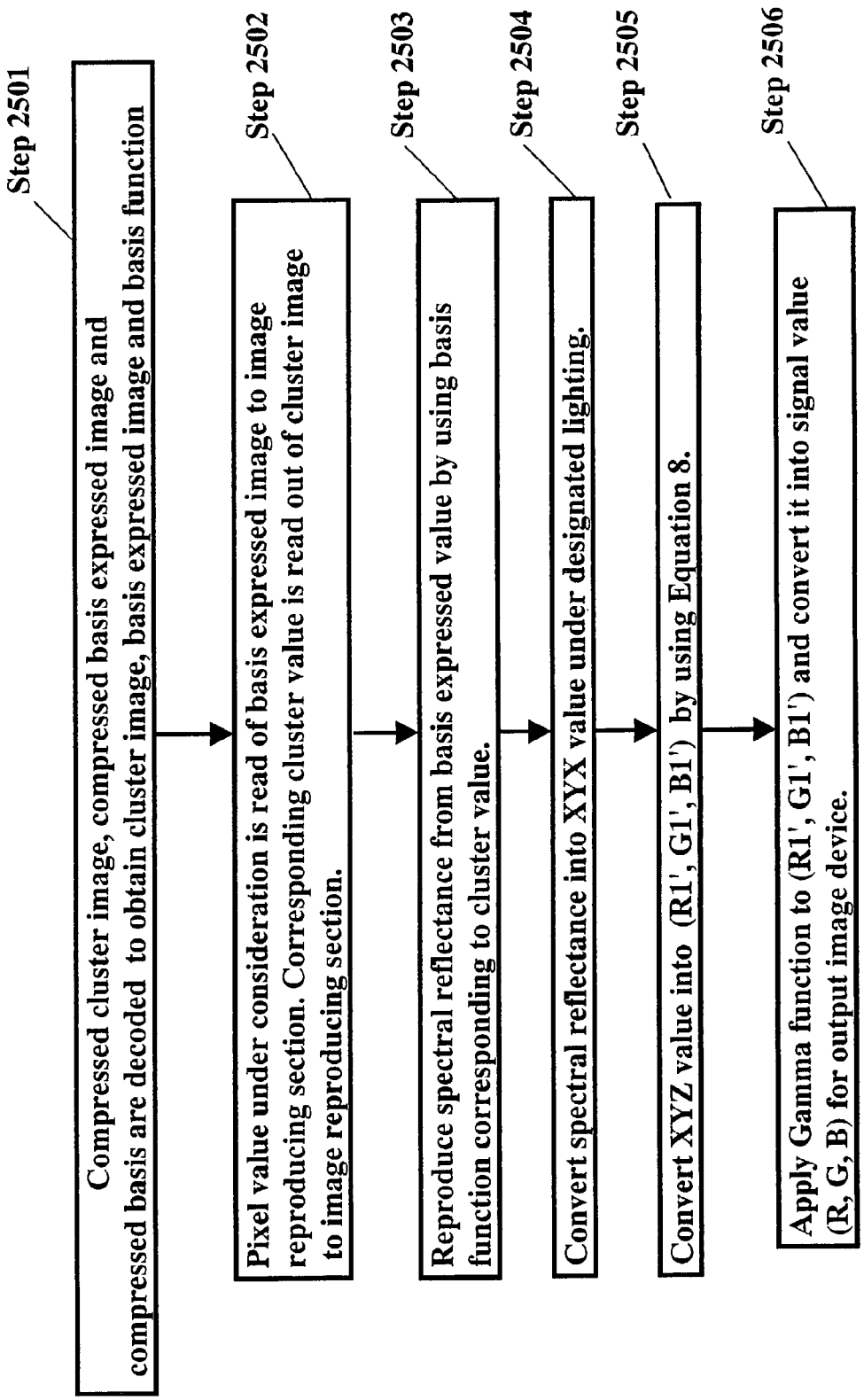
FIG. 25 is a flowchart explaining image reproduction procedure by a reception reproducing section in Embodiment 8 of the invention.

Next, explanation will be made on the operation procedure of the reception reproducing section of FIG. 24, by using FIG. 25. Instep 2501, when the transmitted compressed cluster image m, compressed basis expressed image p and compressed basis h, are inputted to the reception reproducing section 1706, these are decoded respectively in the cluster image uncompression section 2401, the basis expressing image uncompression section 2402 and the basis reproducing section 2403 to be released from compression, thus being restored into a cluster image k, a basis expressed image n and a basis function g.

Next, in step 2502, the cluster image k is stored to a cluster image storage section 2409, the basis expressed image n is to the basis expressed image storage section 2408 and the basis function g is to the cluster-base basis storage section 2407. The basis expressed images a stored in the basis expressed image storage section 2408 are read as, pixel by pixel, as a pixel value r being considered to the image uncompression section 2414. Simultaneously, from the cluster image storage section 2409, a pixel value of a corresponding cluster image is delivered as a cluster value s of a pixel being considered to the image uncompression section 2414.

In step 2503, the image uncompression section 2414 delivers a cluster value s, to which the pixel value r being considered belongs, to the cluster-base basis storage section 2407 and receives a basis function t corresponding to the cluster value s. Using Equation 6 or 7, an original image signal, or spectral reflectance, is reproduced from the pixel value r being considered of the basis expressed image n.

$$x = P_j s \qquad \text{Equation 6}$$

$$x = P_j s + \mu_j \qquad \text{Equation 6}$$

In Equations 6 and 7, x is an expression in column vector of a pixel value (spectral reflectance) of an original image, s is an expression in column vector of a pixel value of a basis expressed image, Pj is a matrix having bases of clusters j arranged as column vectors in a row, and μj is a mean vector of the clusters j.

The dimension order of a pixel value being considered of a basis expressed image n is determined by the image transmission device, according to a situation of a terminal, user or network. Otherwise, a required dimension order is limited in the image reception device. In the case that the dimension order thus determined by any method is, for example, four dimensions, the basis constituting a matrix Pj may be first to fourth main components.

Equation 6 is used where a basis is determined from a variance/covariance matrix, while Equation 7 is used where a basis is determined from a correlation matrix.

The spectral reflectance x obtained in the image uncompression section 2414 is delivered as a pixel reproduction value v being considered to the reproduced-image, storage section 2416. Completing the process on one pixel, the next pixel is read out.

By repeating the above operation for all the pixels, a reproduced image w is obtained and outputted from the reception reproducing section 1706.

Incidentally, in the case that the compression image is a moving image, compressed bases h are transmitted only at an interval of a fixed number of frames or of scene change, as shown in Embodiment 2. Consequently, the basis stored in the cluster-base basis storage section 2407 need not be rewritten before transmitting a new compressed basis h.

Next, explanation is made on the detailed operation of the cluster image uncompression section 2401, basis expressing image uncompression section 2402 and basis reproducing section 2403.

Figure 26:
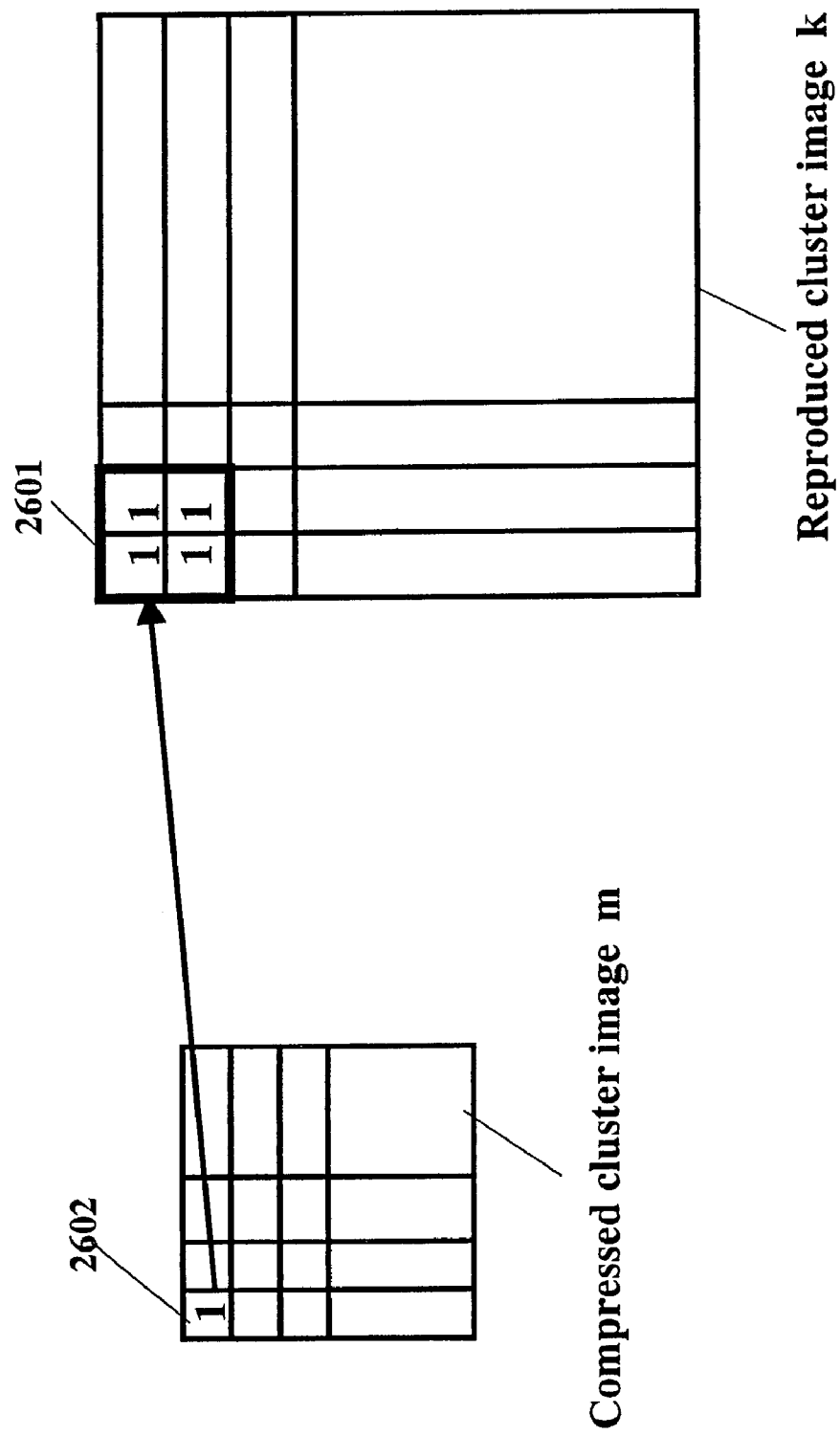
FIG. 26 is a concept view explaining the operation of sub-sampling reproduction by the reception reproducing section in Embodiment 8 of the invention.

First, the cluster image uncompression section 2401 reproduces a compressed cluster image m into a cluster image k. The cluster image k is being compressed by sub-sampling, for example. In the case that the image is vertically and horizontally made to a half by sub-sampling, one pixel value 2602 is rewritten into the same pixel value of 2×2 blocks 2601 thereby reproducing a cluster image k, as shown in FIG. 26.

Then, the basis expressing image uncompression section 2402 decompresses the compressed basis expressed image p into a basis expressed image n. In the case of applied with a general image compression method on a tone image, e.g. sub-sampling compression, discrete cosine compression, wavelet compression, chaos compression or the like, such compression is first decompressed. The decompressed basis expressed image n is quantized, for example, by a non-linear function as shown in FIG. 13. Accordingly, an inverse function to the non-linear function of FIG. 13 is multiplied for restoration into the original basis expression value. Thus, a basis expressed image n is reproduced and stored in the basis expressed image storage section 2408.

In the case that the basis expressed image n is vector-quantized, reproduction is made by the following method instead of the steps 2502 and 2503. The vector-quantized basis expressed image p comprises a quantized image and a quantized vector, as shown in FIG. 22. For this reason, a quantized vector each pixel value represents is read out of a quantized image thereby reproducing a basis expressed image n.

Next, explanation will be made on a method for reproducing a basis function g in the basis reproducing section 2403. Because the basis function g is to be compressed by sub-sub-sampling or a method that a first component of a basis is sent as it is while, for a second component and the subsequent, coding is made on a differential value of subtracting an i-th component from an (i+1)-th component as shown in FIG. 15, the reproduction of a basis function g is made by a reproducing method due to the method applied. For example, in sub-sampling, reproduction is available by a method similar to the method already explained. In the reproduction by the coding shown in FIG. 15, concerning an (i+1)-th component of a basis function, first component and (i+1)-th components of a compressed value are added together. Thus, a basis function g is reproduced and stored in the cluster-base basis storage section 2407.

By the above procedure, a spectral reflectance image is reproduced as a reproduced image w by the reception reproducing section 1706.

Then, the spectral reflectance image, as shown in FIG. 17, is delivered to the output image converting section 1707 where it is converted into a signal for display on the image output device. The detailed operation of the output image converting section 1707 is explained by using the step 2504 and the subsequent in FIG. 25. Herein, the image output device 1713 is assumably an RGB three-primary-color display as an example.

The output image converting section 1707, in step 2504, first multiplies an isochromatic function on a spectral reflectance as a pixel value of the spectral reflectance image to carry out integration in a wavelength region, thereby calculating XYZ tristimulus value (X1, Y1, Z1). Then, in step 2505, (R1', G1', B1') is determined by Equation 8. In Equation 8, (RX, RY, RZ) are XYZ three stimulus values at a maximum signal of red in the image output device, (GX, GY, GZ) are XYZ three stimulus values at a maximum signal of green in the image output device, and (BX, BY, BZ) are XYZ three stimulus values at a maximum signal of blue in the image output device.

$$\begin{pmatrix} R1' \\ G1' \\ B1' \end{pmatrix} = \begin{pmatrix} RX & GX & BX \\ RY & GY & BY \\ RZ & GZ & BZ \end{pmatrix}^{-1} \begin{pmatrix} X1 \\ Y1 \\ Z1 \end{pmatrix}$$ Equation 8

Finally, in step 2506, (R1', G1', B1') is multiplied by the respective gamma functions of the image output device 1713, thereby being converted into RGB signals (R1, G1, B1) for the image output device 1713. The obtained RGB signal is sent to the image output device 1713, to display an image.

In this embodiment, the operation of the image uncompression section 1706 can be stored on a CDROM so that the program stored on the CDROM can be downloaded onto a RAM of a personal computer and processed by a CPU on the personal computer. Meanwhile, the operation of the image uncompression section 1706 may be stored on a ROM of the image output device 1713 so that a CPU in the image output device 1713 can carry out the foregoing process.

As described above, the present embodiment can realize an image reproduction device for reproducing an accurate image from a cluster image describing to which one of the clusters an image signal belongs, a basis expressed image subjected to different image compressions on a cluster-by-cluster basis, and cluster-base basis functions.

What is claimed is:

1. An image compression device comprising:
   a cluster storing section for storing a parameter for classifying image signals of an input image into a plurality of clusters;
   a cluster fixing section for fixing which cluster each of the inputted image signal belongs to by the use of the parameter; and
   a cluster-base image compressing section for performing different image compression processes on a cluster-by-cluster basis.

2. An image compression device according to claim 1, wherein the cluster-base image compressing section carries out image compression on each of the image signals of the input image by conversion into a lower-order basis coefficient by the use of a basis function previously calculated due to a statistic process on a cluster-by-cluster basis.

3. An image compression device according to claim 1, wherein the cluster is a set of signals to be expressed by a same basis group.

4. An image compression device according to claim 1, wherein the cluster is a set of image signals obtained from an object having a similar color or spectral reflectance.

5. An image compression device according to claim 1, wherein the cluster is to be designated by a user.

6. An image compression device comprising:
   a cluster storing section for storing a parameter for classifying each of the image signals of an input image into a plurality of clusters;
   a cluster-base basis determining section for calculating a basis function previously calculated due to a statistic process on a cluster-by-cluster basis;
   a cluster fixing section for fixing which cluster each of the inputted image signals belongs to by the use of the parameter; and
   a cluster image creating section for creating an image having, as a pixel, a cluster value fixed by the cluster fixing section;
   a basis expressed image creating section for creating a basis expressed image by converting the inputted image signal into a basis coefficient by the use of a basis function dependent upon a result of determination by the cluster fixing section;
   a cluster image compressing section for compressing the cluster image;
   a basis function compressing section for compressing the basis function; and
   a basis expressed image compressing section for compressing the basis expressed image.

7. An image compression device according to claim 6, wherein the basis expressed image compressing section compresses the basis expressed image after nonlinear quantization thereof.

8. An image compression device according to claim 6, wherein compression by the basis expressed image compressing section is to quantize a pixel value of the basis expressed image by using a vector quantization method.

9. An image compression device according to claim 6, wherein a basis function to be determined in the cluster-base basis fixing section comprises a normalizing function and a normalizing-signal basis function.

10. An image compression device according to claim 9, wherein the basis functions are different only in the normalizing function but same in the normalizing-signal basis function on all the clusters.

11. An image compression device according to claim 6, comprising a compression parameter update section to update a compression parameter at an interval of a previously designated number of frames in the case that the input image is a moving image comprising a plurality of frames, thereby using an updated compression parameter as a parameter for an image compression process on a cluster-by-cluster basis.

12. An image compression device according to claim 6, comprising a scene-based compression parameter update section to detect a scene change point from a moving image and update on a scene-by-scene basis in the case that the input image is a moving image comprising a plurality of frames, thereby using an updated scene-based compression parameter as a parameter for an image compression process on a cluster-by-cluster basis.

13. An image compression device comprising:
a basis expressed image creating section for converting each of the inputted image signals into a basis expressing value by the use of a basis function previously calculated due to a statistic process to create an image having the basis expressing value as a pixel value;
a parameter storing section for storing a parameter accompanying the basis function; and
a divisional compressing section for providing one tag to a bundle, of among the basis expressed images, basis expressed images due to higher-order bases in the number of Z and parameters thereof, and different tags to basis expressed images due to bases having an order lower than the higher-order bases in the number of Z and parameters thereof, thereby separately carrying out compressions.

14. The number of bases Z to be bundled into one tag according to claim 13, varies according to a data amount of a compressed image.

15. The number of bases Z to be bundled into one tag according to claim 13, decreases when the data amount of compressed image is greater than a predetermined data amount, and increases when the data amount of compressed image is smaller than the predetermined data amount.

16. An image uncompression apparatus comprising:
a cluster storing section for storing a parameter for classifying an inputted image signal into a plurality of clusters;
a cluster-base basis storing section for storing basis functions based on each cluster inputted;
a cluster fixing section for fixing which cluster the image compressing signal belongs to that is stored in the cluster storing means; and
a cluster-based image uncompression section for reproducing an original image by image restoring process different depending upon the cluster.

17. The cluster-based image uncompression section according to claim 16, reproduces an image by the use of the basis functions different depending on the cluster.

18. The cluster-based image uncompression section according to claim 16, wherein reproduces an image from a cluster image having, as a pixel value, a cluster number to which each image signal belongs, the basis functions on a cluster-by-cluster basis, and a basis expressed image expressed in the basis function.

19. The basis function according to claim 16, comprises a normalizing function and a normalizing-signal basis function.

20. The basis functions according to claim 19, are different only in the normalizing function but same in the normalizing-signal basis function on all the clusters.

21. A parameter according to claim 16, wherein a compression parameter update section to update a compression parameter at an interval of a previously designated number of frames in the case that the input image is a moving image comprising a plurality of frames, thereby using an updated compression parameter as a parameter for an image compression process depending on the cluster.

22. A parameter according to claim 16, wherein a scene-based compression parameter update section to detect a scene change point from a moving image and update on a scene-by-scene basis in the case that the input image is a moving image comprising a plurality of frames, thereby using an updated scene-based compression parameter as a parameter for an image compression process depending on the cluster.

23. A method of compressing an image comprising the steps of:
fixing which cluster each of image signals of an input image belongs to, from a parameter for classifying into a plurality of clusters; and
compressing into a cluster image having, as a pixel value, a cluster number to which the image signal of the input image belongs, a basis function calculated by a statistic process on a cluster-by-cluster basis, and a basis expressed image the input image is expressed by the basic function.

24. A method of reproducing an image comprising the steps of:
storing a parameter for classifying an image signal into a plurality of clusters and basis functions based on each cluster inputted;
determining which cluster each image compressing signal inputted belongs to from the stored parameter; and
reproducing an original image by an image restoring process different based on the determined cluster.

25. A computer readable medium including an image compression program that is adapted to control a computer to function as: cluster storing means for storing a parameter for classifying an image signal of an input image into a plurality of clusters; cluster fixing means for fixing which cluster the inputted image signal belongs to by the use of the parameter; and cluster-based image compressing means for performing a different image compression process on the image signal depending upon the cluster.

26. A computer readable medium including an image reproduction program that is adapted to control a computer to function as: cluster storing means for storing a parameter for classifying an image signal of an input image into a plurality of clusters; cluster-base basis storing means for storing basis functions based on each cluster inputted; cluster fixing means for fixing which cluster each image compressing signal belongs to that is stored in the cluster storing means; and cluster-base image uncompression means for reproducing an original image by a different image restoring process depending upon the cluster.

27. In an image transmitting/receiving apparatus having an image transmission device to compress and transmit an image, an image reception device to receive and convert an compressed image into an output image, an image output device to output the output image and a transmission network connecting between the image transmission device and the image reception device, the image transmitting/receiving apparatus comprising:

the image transmission device having an image compression device for converting and compressing each image signal inputted into a basis expressing value by a previously calculated or inputted basis function, and a divisional transmitting section for selecting a dimension order for transmission from among the compressed basis expressing values to carry out transmission according to image request signal from reception device;

the image reception device having an image request signal transmitting section for requesting, as an image request signal, an image download instruction by a user and an selection instructing signal of information to be received by the user, to the image transmission device, a reception reproducing section for uncompressing a compressed image transmitted from the image transmission device and an output image converting section for generating an output image from the uncompressed signal.

* * * * *